US011734115B2

(12) United States Patent
Li

(10) Patent No.: US 11,734,115 B2
(45) Date of Patent: Aug. 22, 2023

(54) METHOD AND SYSTEM FOR FACILITATING WRITE LATENCY REDUCTION IN A QUEUE DEPTH OF ONE SCENARIO

(71) Applicant: Alibaba Group Holding Limited, Grand Cayman (KY)

(72) Inventor: Shu Li, Bothell, WA (US)

(73) Assignee: Alibaba Group Holding Limited, George Town (KY)

( * ) Notice: Subject to any disclaimer, the term of this patent is extended or adjusted under 35 U.S.C. 154(b) by 312 days.

(21) Appl. No.: 17/135,404

(22) Filed: Dec. 28, 2020

(65) Prior Publication Data

US 2022/0206894 A1 Jun. 30, 2022

(51) Int. Cl.
| | | |
|---|---|---|
| *G06F 11/10* | (2006.01) | |
| *G06F 12/02* | (2006.01) | |
| *G06F 11/30* | (2006.01) | |
| *G06F 13/16* | (2006.01) | |

(52) U.S. Cl.
CPC ...... *G06F 11/1076* (2013.01); *G06F 11/3034* (2013.01); *G06F 12/0238* (2013.01); *G06F 12/0253* (2013.01); *G06F 13/1673* (2013.01)

(58) Field of Classification Search
CPC ............. G06F 12/0238; G06F 12/0253; G06F 11/1076; G06F 11/3034
See application file for complete search history.

(56) References Cited

U.S. PATENT DOCUMENTS

| | | |
|---|---|---|
| 3,893,071 A | 7/1975 | Bossen |
| 4,562,494 A | 12/1985 | Bond |
| 4,718,067 A | 1/1988 | Peters |
| (Continued) | | |

FOREIGN PATENT DOCUMENTS

| | | |
|---|---|---|
| JP | 2003022209 | 1/2003 |
| JP | 2011175422 | 9/2011 |
| (Continued) | | |

OTHER PUBLICATIONS

M.-C. Yang, Y.-M. Chang, C.-W. Tsao, P.-C. Huang, Y.-H. Chang and T.-W. Kuo, "Garbage collection and wear leveling for flash memory: Past and future," 2014 International Conference on Smart Computing, Hong Kong, China, 2014, pp. 66-73.*

(Continued)

*Primary Examiner* — Pierre Michel Bataille
(74) *Attorney, Agent, or Firm* — Shun Yao; Yao Legal Services, Inc.

(57) ABSTRACT

One embodiment provides a system which facilitates data management. During operation, the system processes, by a storage device, a write request and data associated with the write request, wherein the storage device comprises a plurality of channels over which to access a non-volatile memory of the storage device. The system writes the data to a first data buffer of the storage device while bypassing a first interface and a memory controller. The system sends the write request to the memory controller via the first interface. The system writes, via a first channel allocated for host write operations, the data from the first data buffer to the non-volatile memory. The system performs a garbage collection operation on the data, which comprises accessing the data via a second channel allocated for garbage collection operations.

17 Claims, 11 Drawing Sheets

(56) References Cited

U.S. PATENT DOCUMENTS

| | | |
|---|---|---|
| 4,775,932 A | 10/1988 | Oxley |
| 4,858,040 A | 8/1989 | Hazebrouck |
| 5,394,382 A | 2/1995 | Hu |
| 5,602,693 A | 2/1997 | Brunnett |
| 5,715,471 A | 2/1998 | Otsuka |
| 5,732,093 A | 3/1998 | Huang |
| 5,802,551 A | 9/1998 | Komatsu |
| 5,930,167 A | 7/1999 | Lee |
| 6,098,185 A | 8/2000 | Wilson |
| 6,148,377 A | 11/2000 | Carter |
| 6,226,650 B1 | 5/2001 | Mahajan et al. |
| 6,243,795 B1 | 6/2001 | Yang |
| 6,457,104 B1 | 9/2002 | Tremaine |
| 6,658,478 B1 | 12/2003 | Singhal |
| 6,795,894 B1 | 9/2004 | Neufeld |
| 7,351,072 B2 | 4/2008 | Muff |
| 7,565,454 B2 | 7/2009 | Zuberi |
| 7,599,139 B1 | 10/2009 | Bombet |
| 7,953,899 B1 | 5/2011 | Hooper |
| 7,958,433 B1 | 6/2011 | Yoon |
| 8,024,719 B2 | 9/2011 | Gorton, Jr. |
| 8,085,569 B2 | 12/2011 | Kim |
| 8,144,512 B2 | 3/2012 | Huang |
| 8,166,233 B2 | 4/2012 | Schibilla |
| 8,260,924 B2 | 9/2012 | Koretz |
| 8,281,061 B2 | 10/2012 | Radke |
| 8,452,819 B1 | 5/2013 | Sorenson, III |
| 8,516,284 B2 | 8/2013 | Chan |
| 8,527,544 B1 | 9/2013 | Colgrove |
| 8,751,763 B1 | 6/2014 | Ramarao |
| 8,819,367 B1 | 8/2014 | Fallone |
| 8,825,937 B2 | 9/2014 | Atkisson |
| 8,832,688 B2 | 9/2014 | Tang |
| 8,868,825 B1 | 10/2014 | Hayes |
| 8,904,061 B1 | 12/2014 | O'Brien, III |
| 8,949,208 B1 | 2/2015 | Xu |
| 9,015,561 B1 | 4/2015 | Hu |
| 9,031,296 B2 | 5/2015 | Kaempfer |
| 9,043,545 B2 | 5/2015 | Kimmel |
| 9,088,300 B1 | 7/2015 | Chen |
| 9,092,223 B1 | 7/2015 | Pani |
| 9,129,628 B1 | 9/2015 | Fallone |
| 9,141,176 B1 | 9/2015 | Chen |
| 9,208,817 B1 | 12/2015 | Li |
| 9,213,627 B2 | 12/2015 | Van Acht |
| 9,213,632 B1 | 12/2015 | Song |
| 9,251,058 B2 | 2/2016 | Nellans |
| 9,258,014 B2 | 2/2016 | Anderson |
| 9,280,472 B1 | 3/2016 | Dang |
| 9,280,487 B2 | 3/2016 | Candelaria |
| 9,311,939 B1 | 4/2016 | Malina |
| 9,336,340 B1 | 5/2016 | Dong |
| 9,436,595 B1 | 9/2016 | Benitez |
| 9,495,263 B2 | 11/2016 | Pang |
| 9,529,601 B1 | 12/2016 | Dharmadhikari |
| 9,529,670 B2 | 12/2016 | O'Connor |
| 9,569,454 B2 | 2/2017 | Ebsen |
| 9,575,982 B1 | 2/2017 | Sankara Subramanian |
| 9,588,698 B1 | 3/2017 | Karamcheti |
| 9,588,977 B1 | 3/2017 | Wang |
| 9,607,631 B2 | 3/2017 | Rausch |
| 9,671,971 B2 | 6/2017 | Trika |
| 9,722,632 B2 | 8/2017 | Anderson |
| 9,747,202 B1 | 8/2017 | Shaharabany |
| 9,830,084 B2 | 11/2017 | Thakkar |
| 9,836,232 B1 | 12/2017 | Vasquez |
| 9,852,076 B1 | 12/2017 | Garg |
| 9,875,053 B2 | 1/2018 | Frid |
| 9,910,705 B1 | 3/2018 | Mak |
| 9,912,530 B2 | 3/2018 | Singatwaria |
| 9,923,562 B1 | 3/2018 | Vinson |
| 9,933,973 B2 | 4/2018 | Luby |
| 9,946,596 B2 | 4/2018 | Hashimoto |
| 10,013,169 B2 | 7/2018 | Fisher |
| 10,199,066 B1 | 2/2019 | Feldman |
| 10,229,735 B1 | 3/2019 | Natarajan |
| 10,235,198 B2 | 3/2019 | Qiu |
| 10,268,390 B2 | 4/2019 | Warfield |
| 10,318,467 B2 | 6/2019 | Barzik |
| 10,361,722 B2 | 7/2019 | Lee |
| 10,417,086 B2 | 9/2019 | Lin |
| 10,437,670 B1 | 10/2019 | Koltsidas |
| 10,459,663 B2 | 10/2019 | Agombar |
| 10,459,794 B2 | 10/2019 | Baek |
| 10,466,907 B2 | 11/2019 | Gole |
| 10,484,019 B2 | 11/2019 | Weinberg |
| 10,530,391 B2 | 1/2020 | Galbraith |
| 10,635,529 B2 | 4/2020 | Bolkhovitin |
| 10,642,522 B2 | 5/2020 | Li |
| 10,649,657 B2 | 5/2020 | Zaidman |
| 10,649,969 B2 | 5/2020 | De |
| 10,678,432 B1 | 6/2020 | Dreier |
| 10,756,816 B1 | 8/2020 | Dreier |
| 10,831,734 B2 | 11/2020 | Li |
| 10,877,835 B2 * | 12/2020 | Wang ................ G06F 11/1048 |
| 10,928,847 B2 | 2/2021 | Suresh |
| 10,990,526 B1 | 4/2021 | Lam |
| 11,016,932 B2 | 5/2021 | Qiu |
| 11,023,150 B2 | 6/2021 | Pletka |
| 11,068,165 B2 | 7/2021 | Sharon |
| 11,068,409 B2 | 7/2021 | Li |
| 11,126,561 B2 | 9/2021 | Li |
| 11,138,124 B2 | 10/2021 | Tomic |
| 11,243,694 B2 | 2/2022 | Liang |
| 11,360,863 B2 | 6/2022 | Varadan |
| 2001/0003205 A1 | 6/2001 | Gilbert |
| 2001/0032324 A1 | 10/2001 | Slaughter |
| 2001/0046295 A1 | 11/2001 | Sako |
| 2002/0010783 A1 | 1/2002 | Primak |
| 2002/0039260 A1 | 4/2002 | Kilmer |
| 2002/0073358 A1 | 6/2002 | Atkinson |
| 2002/0095403 A1 | 7/2002 | Chandrasekaran |
| 2002/0112085 A1 | 8/2002 | Berg |
| 2002/0161890 A1 | 10/2002 | Chen |
| 2003/0074319 A1 | 4/2003 | Jaquette |
| 2003/0108061 A1 * | 6/2003 | Black ............... H04L 12/40084 |
| | | 370/447 |
| 2003/0145274 A1 | 7/2003 | Hwang |
| 2003/0163594 A1 | 8/2003 | Aasheim |
| 2003/0163633 A1 | 8/2003 | Aasheim |
| 2003/0217080 A1 | 11/2003 | White |
| 2004/0010545 A1 | 1/2004 | Pandya |
| 2004/0066741 A1 | 4/2004 | Dinker |
| 2004/0103238 A1 | 5/2004 | Avraham |
| 2004/0143718 A1 | 7/2004 | Chen |
| 2004/0255171 A1 | 12/2004 | Zimmer |
| 2004/0267752 A1 | 12/2004 | Wong |
| 2004/0268278 A1 | 12/2004 | Hoberman |
| 2005/0038954 A1 | 2/2005 | Saliba |
| 2005/0097126 A1 | 5/2005 | Cabrera |
| 2005/0138325 A1 | 6/2005 | Hofstee |
| 2005/0144358 A1 | 6/2005 | Conley |
| 2005/0149827 A1 | 7/2005 | Lambert |
| 2005/0174670 A1 | 8/2005 | Dunn |
| 2005/0177672 A1 | 8/2005 | Rao |
| 2005/0177755 A1 | 8/2005 | Fung |
| 2005/0195635 A1 | 9/2005 | Conley |
| 2005/0235067 A1 | 10/2005 | Creta |
| 2005/0235171 A1 | 10/2005 | Igari |
| 2006/0031709 A1 | 2/2006 | Hiraiwa |
| 2006/0101197 A1 | 5/2006 | Georgis |
| 2006/0156009 A1 | 7/2006 | Shin |
| 2006/0156012 A1 | 7/2006 | Beeson |
| 2006/0184813 A1 | 8/2006 | Bui |
| 2007/0033323 A1 | 2/2007 | Gorobets |
| 2007/0061502 A1 | 3/2007 | Lasser |
| 2007/0061542 A1 | 3/2007 | Uppala |
| 2007/0101096 A1 | 5/2007 | Gorobets |
| 2007/0168581 A1 | 7/2007 | Klein |
| 2007/0204128 A1 | 8/2007 | Lee |
| 2007/0250756 A1 | 10/2007 | Gower |
| 2007/0266011 A1 | 11/2007 | Rohrs |
| 2007/0283081 A1 | 12/2007 | Lasser |
| 2007/0283104 A1 | 12/2007 | Wellwood |

(56) References Cited

U.S. PATENT DOCUMENTS

| | | |
|---|---|---|
| 2007/0285980 A1 | 12/2007 | Shimizu |
| 2008/0028223 A1 | 1/2008 | Rhoads |
| 2008/0034154 A1 | 2/2008 | Lee |
| 2008/0065805 A1 | 3/2008 | Wu |
| 2008/0082731 A1 | 4/2008 | Karamcheti |
| 2008/0104369 A1 | 5/2008 | Reed |
| 2008/0112238 A1 | 5/2008 | Kim |
| 2008/0163033 A1 | 7/2008 | Yim |
| 2008/0195829 A1 | 8/2008 | Wilsey |
| 2008/0301532 A1 | 12/2008 | Uchikawa |
| 2009/0006667 A1 | 1/2009 | Lin |
| 2009/0089544 A1 | 4/2009 | Liu |
| 2009/0110078 A1 | 4/2009 | Crinon |
| 2009/0113219 A1 | 4/2009 | Aharonov |
| 2009/0125788 A1 | 5/2009 | Wheeler |
| 2009/0177944 A1 | 7/2009 | Kanno |
| 2009/0183052 A1 | 7/2009 | Kanno |
| 2009/0254705 A1 | 10/2009 | Abali |
| 2009/0282275 A1 | 11/2009 | Yermalayeu |
| 2009/0287956 A1 | 11/2009 | Flynn |
| 2009/0307249 A1 | 12/2009 | Koifman |
| 2009/0307426 A1 | 12/2009 | Galloway |
| 2009/0310412 A1 | 12/2009 | Jang |
| 2010/0031000 A1 | 2/2010 | Flynn |
| 2010/0169470 A1 | 7/2010 | Takashige |
| 2010/0217952 A1 | 8/2010 | Iyer |
| 2010/0229224 A1 | 9/2010 | Etchegoyen |
| 2010/0241848 A1 | 9/2010 | Smith |
| 2010/0281254 A1 | 11/2010 | Carro |
| 2010/0321999 A1 | 12/2010 | Yoo |
| 2010/0325367 A1 | 12/2010 | Kornegay |
| 2010/0332922 A1 | 12/2010 | Chang |
| 2011/0031546 A1 | 2/2011 | Uenaka |
| 2011/0055458 A1 | 3/2011 | Kuehne |
| 2011/0055471 A1 | 3/2011 | Thatcher |
| 2011/0060722 A1 | 3/2011 | Li |
| 2011/0072204 A1 | 3/2011 | Chang |
| 2011/0099418 A1 | 4/2011 | Chen |
| 2011/0153903 A1 | 6/2011 | Hinkle |
| 2011/0161621 A1 | 6/2011 | Sinclair |
| 2011/0161784 A1 | 6/2011 | Selinger |
| 2011/0191525 A1 | 8/2011 | Hsu |
| 2011/0218969 A1 | 9/2011 | Anglin |
| 2011/0231598 A1 | 9/2011 | Hatsuda |
| 2011/0239083 A1 | 9/2011 | Kanno |
| 2011/0252188 A1 | 10/2011 | Weingarten |
| 2011/0258514 A1 | 10/2011 | Lasser |
| 2011/0289263 A1 | 11/2011 | McWilliams |
| 2011/0289280 A1 | 11/2011 | Koseki |
| 2011/0292538 A1 | 12/2011 | Haga |
| 2011/0296411 A1 | 12/2011 | Tang |
| 2011/0299317 A1 | 12/2011 | Shaeffer |
| 2011/0302353 A1 | 12/2011 | Confalonieri |
| 2011/0302408 A1 | 12/2011 | McDermott |
| 2012/0017037 A1 | 1/2012 | Riddle |
| 2012/0039117 A1 | 2/2012 | Webb |
| 2012/0084523 A1 | 4/2012 | Littlefield |
| 2012/0089774 A1 | 4/2012 | Kelkar |
| 2012/0096330 A1 | 4/2012 | Przybylski |
| 2012/0117399 A1 | 5/2012 | Chan |
| 2012/0147021 A1 | 6/2012 | Cheng |
| 2012/0151253 A1 | 6/2012 | Horn |
| 2012/0159099 A1 | 6/2012 | Lindamood |
| 2012/0159289 A1 | 6/2012 | Piccirillo |
| 2012/0173792 A1 | 7/2012 | Lassa |
| 2012/0203958 A1 | 8/2012 | Jones |
| 2012/0210095 A1 | 8/2012 | Nellans |
| 2012/0233523 A1 | 9/2012 | Krishnamoorthy |
| 2012/0246392 A1 | 9/2012 | Cheon |
| 2012/0278579 A1 | 11/2012 | Goss |
| 2012/0284587 A1 | 11/2012 | Yu |
| 2012/0324312 A1 | 12/2012 | Moyer |
| 2012/0331207 A1 | 12/2012 | Lassa |
| 2013/0013880 A1 | 1/2013 | Tashiro |
| 2013/0013887 A1 | 1/2013 | Sugahara |
| 2013/0016970 A1 | 1/2013 | Koka |
| 2013/0018852 A1 | 1/2013 | Barton |
| 2013/0024605 A1 | 1/2013 | Sharon |
| 2013/0054822 A1 | 2/2013 | Mordani |
| 2013/0061029 A1 | 3/2013 | Huff |
| 2013/0073798 A1 | 3/2013 | Kang |
| 2013/0080391 A1 | 3/2013 | Raichstein |
| 2013/0138871 A1 | 5/2013 | Chiu |
| 2013/0144836 A1 | 6/2013 | Adzic |
| 2013/0145085 A1 | 6/2013 | Yu |
| 2013/0145089 A1 | 6/2013 | Eleftheriou |
| 2013/0151759 A1 | 6/2013 | Shim |
| 2013/0159251 A1 | 6/2013 | Skrenta |
| 2013/0159723 A1 | 6/2013 | Brandt |
| 2013/0166820 A1 | 6/2013 | Batwara |
| 2013/0173845 A1 | 7/2013 | Aslam |
| 2013/0179898 A1 | 7/2013 | Fang |
| 2013/0191601 A1 | 7/2013 | Peterson |
| 2013/0205183 A1 | 8/2013 | Fillingim |
| 2013/0219131 A1 | 8/2013 | Alexandron |
| 2013/0227347 A1 | 8/2013 | Cho |
| 2013/0238955 A1 | 9/2013 | D'Abreu |
| 2013/0254622 A1 | 9/2013 | Kanno |
| 2013/0318283 A1 | 11/2013 | Small |
| 2013/0318395 A1 | 11/2013 | Kalavade |
| 2013/0325419 A1 | 12/2013 | Al-Shaikh |
| 2013/0329492 A1 | 12/2013 | Yang |
| 2013/0346532 A1 | 12/2013 | D Amato |
| 2014/0006688 A1 | 1/2014 | Yu |
| 2014/0019650 A1 | 1/2014 | Li |
| 2014/0019661 A1 * | 1/2014 | Hormuth ............... G06F 13/00 710/306 |
| 2014/0025638 A1 | 1/2014 | Hu |
| 2014/0082273 A1 | 3/2014 | Segev |
| 2014/0082412 A1 | 3/2014 | Matsumura |
| 2014/0095758 A1 | 4/2014 | Smith |
| 2014/0095769 A1 | 4/2014 | Borkenhagen |
| 2014/0095827 A1 | 4/2014 | Wei |
| 2014/0108414 A1 | 4/2014 | Stillerman |
| 2014/0108891 A1 | 4/2014 | Strasser |
| 2014/0164447 A1 | 6/2014 | Tarafdar |
| 2014/0164879 A1 | 6/2014 | Tam |
| 2014/0181532 A1 | 6/2014 | Camp |
| 2014/0195564 A1 | 7/2014 | Talagala |
| 2014/0215129 A1 | 7/2014 | Kuzmin |
| 2014/0223079 A1 | 8/2014 | Zhang |
| 2014/0233950 A1 | 8/2014 | Luo |
| 2014/0250259 A1 | 9/2014 | Ke |
| 2014/0279927 A1 | 9/2014 | Constantinescu |
| 2014/0304452 A1 | 10/2014 | De La Iglesia |
| 2014/0310574 A1 | 10/2014 | Yu |
| 2014/0337457 A1 | 11/2014 | Nowoczynski |
| 2014/0359229 A1 | 12/2014 | Cota-Robles |
| 2014/0365707 A1 | 12/2014 | Talagala |
| 2014/0379965 A1 | 12/2014 | Gole |
| 2015/0006792 A1 | 1/2015 | Lee |
| 2015/0019798 A1 | 1/2015 | Huang |
| 2015/0039849 A1 | 2/2015 | Lewis |
| 2015/0067436 A1 | 3/2015 | Hu |
| 2015/0082317 A1 | 3/2015 | You |
| 2015/0106556 A1 | 4/2015 | Yu |
| 2015/0106559 A1 | 4/2015 | Cho |
| 2015/0121031 A1 | 4/2015 | Feng |
| 2015/0142752 A1 | 5/2015 | Chennamsetty |
| 2015/0143030 A1 | 5/2015 | Gorobets |
| 2015/0186657 A1 | 7/2015 | Nakhjiri |
| 2015/0199234 A1 | 7/2015 | Choi |
| 2015/0227316 A1 | 8/2015 | Warfield |
| 2015/0234845 A1 | 8/2015 | Moore |
| 2015/0269964 A1 | 9/2015 | Fallone |
| 2015/0277937 A1 | 10/2015 | Swanson |
| 2015/0286477 A1 | 10/2015 | Mathur |
| 2015/0294684 A1 | 10/2015 | Qjang |
| 2015/0301964 A1 | 10/2015 | Brinicombe |
| 2015/0304108 A1 | 10/2015 | Obukhov |
| 2015/0310916 A1 | 10/2015 | Leem |
| 2015/0317095 A1 | 11/2015 | Voigt |
| 2015/0341123 A1 | 11/2015 | Nagarajan |
| 2015/0347025 A1 | 12/2015 | Law |

(56) References Cited

U.S. PATENT DOCUMENTS

| | | |
|---|---|---|
| 2015/0363271 A1 | 12/2015 | Haustein |
| 2015/0363328 A1 | 12/2015 | Candelaria |
| 2015/0370700 A1* | 12/2015 | Sabol .................. G06F 3/0679 711/103 |
| 2015/0372597 A1 | 12/2015 | Luo |
| 2016/0014039 A1 | 1/2016 | Reddy |
| 2016/0026575 A1 | 1/2016 | Samanta |
| 2016/0041760 A1 | 2/2016 | Kuang |
| 2016/0048327 A1 | 2/2016 | Jayasena |
| 2016/0048341 A1 | 2/2016 | Constantinescu |
| 2016/0054922 A1 | 2/2016 | Awasthi |
| 2016/0062885 A1 | 3/2016 | Ryu |
| 2016/0077749 A1 | 3/2016 | Ravimohan |
| 2016/0077764 A1 | 3/2016 | Ori |
| 2016/0077968 A1 | 3/2016 | Sela |
| 2016/0078245 A1 | 3/2016 | Amarendran |
| 2016/0098344 A1 | 4/2016 | Gorobets |
| 2016/0098350 A1 | 4/2016 | Tang |
| 2016/0103631 A1 | 4/2016 | Ke |
| 2016/0110254 A1 | 4/2016 | Cronie |
| 2016/0124742 A1 | 5/2016 | Rangasamy |
| 2016/0132237 A1 | 5/2016 | Jeong |
| 2016/0141047 A1 | 5/2016 | Sehgal |
| 2016/0154601 A1 | 6/2016 | Chen |
| 2016/0155750 A1 | 6/2016 | Yasuda |
| 2016/0162187 A1 | 6/2016 | Lee |
| 2016/0179399 A1 | 6/2016 | Melik-Martirosian |
| 2016/0188223 A1 | 6/2016 | Camp |
| 2016/0188890 A1 | 6/2016 | Naeimi |
| 2016/0203000 A1 | 7/2016 | Parmar |
| 2016/0224267 A1 | 8/2016 | Yang |
| 2016/0232103 A1 | 8/2016 | Schmisseur |
| 2016/0234297 A1 | 8/2016 | Ambach |
| 2016/0239074 A1 | 8/2016 | Lee |
| 2016/0239380 A1 | 8/2016 | Wideman |
| 2016/0274636 A1 | 9/2016 | Kim |
| 2016/0283140 A1 | 9/2016 | Kaushik |
| 2016/0306699 A1 | 10/2016 | Resch |
| 2016/0306853 A1 | 10/2016 | Sabaa |
| 2016/0321002 A1 | 11/2016 | Jung |
| 2016/0335085 A1 | 11/2016 | Scalabrino |
| 2016/0342345 A1 | 11/2016 | Kankani |
| 2016/0343429 A1 | 11/2016 | Nieuwejaar |
| 2016/0350002 A1 | 12/2016 | Vergis |
| 2016/0350385 A1 | 12/2016 | Poder |
| 2016/0364146 A1 | 12/2016 | Kuttner |
| 2016/0381442 A1 | 12/2016 | Heanue |
| 2017/0004037 A1 | 1/2017 | Park |
| 2017/0010652 A1 | 1/2017 | Huang |
| 2017/0068639 A1 | 3/2017 | Davis |
| 2017/0075583 A1 | 3/2017 | Alexander |
| 2017/0075594 A1 | 3/2017 | Badam |
| 2017/0091110 A1 | 3/2017 | Ash |
| 2017/0109199 A1 | 4/2017 | Chen |
| 2017/0109232 A1 | 4/2017 | Cha |
| 2017/0123655 A1 | 5/2017 | Sinclair |
| 2017/0147499 A1 | 5/2017 | Mohan |
| 2017/0161202 A1 | 6/2017 | Erez |
| 2017/0162235 A1 | 6/2017 | De |
| 2017/0168986 A1 | 6/2017 | Sajeepa |
| 2017/0177217 A1 | 6/2017 | Kanno |
| 2017/0177259 A1 | 6/2017 | Motwani |
| 2017/0185316 A1 | 6/2017 | Nieuwejaar |
| 2017/0185498 A1 | 6/2017 | Gao |
| 2017/0192848 A1 | 7/2017 | Pamies-Juarez |
| 2017/0199823 A1 | 7/2017 | Hayes |
| 2017/0206131 A1* | 7/2017 | Christensen ............ G06F 3/064 |
| 2017/0212680 A1 | 7/2017 | Waghulde |
| 2017/0212708 A1 | 7/2017 | Suhas |
| 2017/0220254 A1 | 8/2017 | Warfield |
| 2017/0221519 A1 | 8/2017 | Matsuo |
| 2017/0228157 A1 | 8/2017 | Yang |
| 2017/0242722 A1 | 8/2017 | Qiu |
| 2017/0242768 A1* | 8/2017 | Park .................. G06F 11/2069 |
| 2017/0249162 A1 | 8/2017 | Tsirkin |
| 2017/0262176 A1 | 9/2017 | Kanno |
| 2017/0262178 A1 | 9/2017 | Hashimoto |
| 2017/0262217 A1 | 9/2017 | Pradhan |
| 2017/0269998 A1 | 9/2017 | Jung |
| 2017/0277655 A1 | 9/2017 | Das |
| 2017/0279460 A1 | 9/2017 | Camp |
| 2017/0285976 A1 | 10/2017 | Durham |
| 2017/0286311 A1 | 10/2017 | Juenemann |
| 2017/0322888 A1 | 11/2017 | Booth |
| 2017/0344470 A1 | 11/2017 | Yang |
| 2017/0344491 A1 | 11/2017 | Pandurangan |
| 2017/0353576 A1 | 12/2017 | Guim Bernat |
| 2018/0024772 A1 | 1/2018 | Madraswala |
| 2018/0024779 A1 | 1/2018 | Kojima |
| 2018/0033491 A1 | 2/2018 | Marelli |
| 2018/0052797 A1 | 2/2018 | Barzik |
| 2018/0067847 A1 | 3/2018 | Oh |
| 2018/0069658 A1 | 3/2018 | Benisty |
| 2018/0074730 A1 | 3/2018 | Inoue |
| 2018/0076828 A1 | 3/2018 | Kanno |
| 2018/0088867 A1 | 3/2018 | Kaminaga |
| 2018/0107591 A1 | 4/2018 | Smith |
| 2018/0113631 A1 | 4/2018 | Zhang |
| 2018/0143780 A1 | 5/2018 | Cho |
| 2018/0150640 A1 | 5/2018 | Li |
| 2018/0165038 A1 | 6/2018 | Authement |
| 2018/0165169 A1 | 6/2018 | Camp |
| 2018/0165340 A1 | 6/2018 | Agarwal |
| 2018/0167268 A1 | 6/2018 | Liguori |
| 2018/0173620 A1 | 6/2018 | Cen |
| 2018/0188970 A1 | 7/2018 | Liu |
| 2018/0189175 A1 | 7/2018 | Ji |
| 2018/0189182 A1 | 7/2018 | Wang |
| 2018/0212951 A1 | 7/2018 | Goodrum |
| 2018/0219561 A1 | 8/2018 | Litsyn |
| 2018/0226124 A1 | 8/2018 | Perner |
| 2018/0232151 A1 | 8/2018 | Badam |
| 2018/0260148 A1 | 9/2018 | Klein |
| 2018/0270110 A1 | 9/2018 | Chugtu |
| 2018/0293014 A1 | 10/2018 | Ravimohan |
| 2018/0300203 A1 | 10/2018 | Kathpal |
| 2018/0307620 A1 | 10/2018 | Zhou |
| 2018/0321864 A1 | 11/2018 | Benisty |
| 2018/0322024 A1 | 11/2018 | Nagao |
| 2018/0329776 A1 | 11/2018 | Lai |
| 2018/0336921 A1 | 11/2018 | Ryun |
| 2018/0349396 A1 | 12/2018 | Blagojevic |
| 2018/0356992 A1 | 12/2018 | Lamberts |
| 2018/0357126 A1 | 12/2018 | Dhuse |
| 2018/0373428 A1 | 12/2018 | Kan |
| 2018/0373655 A1 | 12/2018 | Liu |
| 2018/0373664 A1 | 12/2018 | Vijayrao |
| 2019/0004944 A1 | 1/2019 | Widder |
| 2019/0012111 A1 | 1/2019 | Li |
| 2019/0034454 A1 | 1/2019 | Gangumalla |
| 2019/0042571 A1 | 2/2019 | Li |
| 2019/0050312 A1 | 2/2019 | Li |
| 2019/0050327 A1 | 2/2019 | Li |
| 2019/0065085 A1 | 2/2019 | Jean |
| 2019/0073261 A1 | 3/2019 | Halbert |
| 2019/0073262 A1 | 3/2019 | Chen |
| 2019/0087089 A1 | 3/2019 | Yoshida |
| 2019/0087115 A1 | 3/2019 | Li |
| 2019/0087328 A1 | 3/2019 | Kanno |
| 2019/0108145 A1 | 4/2019 | Raghava |
| 2019/0116127 A1 | 4/2019 | Pismenny |
| 2019/0166725 A1 | 5/2019 | Jing |
| 2019/0171532 A1 | 6/2019 | Abadi |
| 2019/0172820 A1 | 6/2019 | Meyers |
| 2019/0196748 A1 | 6/2019 | Badam |
| 2019/0196907 A1 | 6/2019 | Khan |
| 2019/0205206 A1 | 7/2019 | Hornung |
| 2019/0212949 A1 | 7/2019 | Pletka |
| 2019/0220392 A1 | 7/2019 | Lin |
| 2019/0227927 A1 | 7/2019 | Miao |
| 2019/0272242 A1 | 9/2019 | Kachare |
| 2019/0278654 A1 | 9/2019 | Kaynak |
| 2019/0278849 A1 | 9/2019 | Chandramouli |
| 2019/0317901 A1 | 10/2019 | Kachare |

(56) References Cited

U.S. PATENT DOCUMENTS

| | | |
|---|---|---|
| 2019/0320020 A1 | 10/2019 | Lee |
| 2019/0339998 A1 | 11/2019 | Momchilov |
| 2019/0361611 A1 | 11/2019 | Hosogi |
| 2019/0377632 A1 | 12/2019 | Oh |
| 2019/0377821 A1 | 12/2019 | Pleshachkov |
| 2019/0391748 A1 | 12/2019 | Li |
| 2020/0004456 A1 | 1/2020 | Williams |
| 2020/0004674 A1 | 1/2020 | Williams |
| 2020/0013458 A1 | 1/2020 | Schreck |
| 2020/0042223 A1 | 2/2020 | Li |
| 2020/0042387 A1 | 2/2020 | Shani |
| 2020/0082006 A1 | 3/2020 | Rupp |
| 2020/0084918 A1 | 3/2020 | Shen |
| 2020/0089430 A1 | 3/2020 | Kanno |
| 2020/0092209 A1 | 3/2020 | Chen |
| 2020/0097189 A1 | 3/2020 | Tao |
| 2020/0133841 A1 | 4/2020 | Davis |
| 2020/0143885 A1 | 5/2020 | Kim |
| 2020/0159425 A1 | 5/2020 | Flynn |
| 2020/0167091 A1 | 5/2020 | Haridas |
| 2020/0210309 A1 | 7/2020 | Jung |
| 2020/0218449 A1 | 7/2020 | Leitao |
| 2020/0225875 A1 | 7/2020 | Oh |
| 2020/0242021 A1 | 7/2020 | Gholamipour |
| 2020/0250032 A1 | 8/2020 | Goyal |
| 2020/0257598 A1 | 8/2020 | Yazovitsky |
| 2020/0322287 A1 | 10/2020 | Connor |
| 2020/0326855 A1 | 10/2020 | Wu |
| 2020/0328192 A1 | 10/2020 | Zaman |
| 2020/0348888 A1 | 11/2020 | Kim |
| 2020/0364094 A1 | 11/2020 | Kahle |
| 2020/0371955 A1 | 11/2020 | Goodacre |
| 2020/0387327 A1 | 12/2020 | Hsieh |
| 2020/0401334 A1 | 12/2020 | Saxena |
| 2020/0409559 A1 | 12/2020 | Sharon |
| 2020/0409791 A1 | 12/2020 | Devriendt |
| 2021/0010338 A1 | 1/2021 | Santos |
| 2021/0075633 A1 | 3/2021 | Sen |
| 2021/0089392 A1 | 3/2021 | Shirakawa |
| 2021/0103388 A1 | 4/2021 | Choi |
| 2021/0124488 A1 | 4/2021 | Stoica |
| 2021/0132999 A1 | 5/2021 | Haywood |
| 2021/0191635 A1 | 6/2021 | Hu |
| 2021/0263795 A1 | 8/2021 | Li |
| 2021/0286555 A1 | 9/2021 | Li |
| 2022/0121517 A1* | 4/2022 | Kim .................. G06F 11/1417 |

FOREIGN PATENT DOCUMENTS

| | | |
|---|---|---|
| WO | 9418634 | 8/1994 |
| WO | 1994018634 | 8/1994 |

OTHER PUBLICATIONS https://web.archive.org/web/20071130235034/http://en.wikipedia.org:80/wiki/logical_block_addressing wikipedia screen shot retriefed on wayback Nov. 20, 2007 showing both physical and logical addressing used historically to access data on storage devices (Year: 2007).

Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India, pp. 1-7, 2017, <10.1145/3124680.3124741>. <hal-01654985>.

EMC Powerpath Load Balancing and Failover Comparison with native MPIO operating system solutions. Feb. 2011.

Tsuchiya, Yoshihiro et al. "DBLK: Deduplication for Primary Block Storage", MSST 2011, Denver, CO, May 23-27, 2011 pp. 1-5.

Chen Feng, et al. "CAFTL: A Content-Aware Flash Translation Layer Enhancing the Lifespan of Flash Memory based Solid State Devices" < FAST '11, San Jose, CA Feb. 15-17, 2011, pp. 1-14.

Wu, Huijun et al. "HPDedup: A Hybrid Prioritized Data Deduplication Mechanism for Primary Storage in the Cloud", Cornell Univ. arXiv: 1702.08153v2[cs.DC], Apr. 16, 2017, pp. 1-14https://www.syncids.com/#.

WOW: Wise Ordering for Writes—Combining Spatial and Temporal Locality in Non-Volatile Caches by Gill (Year: 2005).

Helen H. W. Chan et al. "HashKV: Enabling Efficient Updated in KV Storage via Hashing", https://www.usenix.org/conference/atc18/presentation/chan, (Year: 2018).

S. Hong and D. Shin, "NAND Flash-Based Disk Cache Using SLC/MLC Combined Flash Memory," 2010 International Workshop on Storage Network Architecture and Parallel I/Os, Incline Village, NV, 2010, pp. 21-30.

Arpaci-Dusseau et al. "Operating Systems: Three Easy Pieces", Originally published 2015; Pertinent: Chapter 44; flash-based SSDs, available at http://pages.cs.wisc.edu/~remzi/OSTEP/.

Jimenex, X., Novo, D. and P. Ienne, "Pheonix:Reviving MLC Blocks as SLC to Extend NAND Flash Devices Lifetime," Design, Automation & Text in Europe Conference & Exhibition (Date), 2013.

Yang, T. Wu, H. and W. Sun, "GD-FTL: Improving the Performance and Lifetime of TLC SSD by Downgrading Worn-out Blocks," IEEE 37th International Performance Computing and Communications Conference (IPCCC), 2018.

C. Wu, D. Wu, H. Chou and C. Cheng, "Rethink the Design of Flash Translation Layers in a Component-Based View", in IEEE Acess, vol. 5, pp. 12895-12912, 2017.

Po-Liang Wu, Yuan-Hao Chang and T. Kuo, "A file-system-aware FTL design for flash-memory storage systems," 2009, pp. 393-398.

S. Choudhuri and T. Givargis, "Preformance improvement of block based NAND flash translation layer", 2007 5th IEEE/ACM/IFIP International Conference on Hardware/Software Codesign and Systems Synthesis (CODES+ISSS). Saizburg, 2007, pp. 257-262.

A. Zuck, O. Kishon and S. Toledo. "LSDM: Improving the Preformance of Mobile Storage with a Log-Structured Address Remapping Device Driver", 2014 Eighth International Conference on Next Generation Mobile Apps, Services and Technologies, Oxford, 2014, pp. 221-228.

J. Jung and Y. Won, "nvramdisk: A Transactional Block Device Driver for Non-Volatile RAM", in IEEE Transactions on Computers, vol. 65, No. 2, pp. 589-600, Feb. 1, 2016.

Te I et al. (Pensieve: a Machine Assisted SSD Layer for Extending the Lifetime: (Year: 2018).

ARM ("Cortex-R5 and Cortex-R5F", Technical reference Manual, Revision r1p1) (Year:2011).

* cited by examiner

METHOD AND SYSTEM FOR FACILITATING WRITE LATENCY REDUCTION IN A QUEUE DEPTH OF ONE SCENARIO

BACKGROUND

Field

This disclosure is generally related to the field of data storage. More specifically, this disclosure is related to a method and system for facilitating a write latency reduction in a queue depth of one scenario.

Related Art

Today, various storage systems are being used to store and access the ever-increasing amount of digital content. A storage system can include storage servers with one or more storage devices or drives (such as a solid-state drive (SSD)). Data can be stored in a non-volatile storage media of an SSD, e.g., in Not-And flash (NAND) flash. Performance-demanding applications continue to result in increasing the queue depth of a storage device to the order of the hundreds in order to achieve an enhanced throughput. In addition, parallelism continues to grow at an increasing pace in order to address or overcome the generally long write latency associated with NAND flash. While the performance of an SSD in handling a queue depth of one may not be a practical scenario, the performance in handling a queue depth of one may still be used to evaluate an SSD as a non-trivial metric of the qualifications and features of the SSD.

One current solution for increasing the performance of an SSD involves using a Peripheral Component Interconnect Express (PCIe) interface, which places the storage drive closer to the host and provide a lower latency. The Non-Volatile Memory Express (NVMe) protocol can utilize the PCIe interface in order to communicate with the host. However, a write request and associated data must travel through the PCIe interface four times (as depicted below in relation to FIG. 1), which can lead to challenges with reducing the latency, and also presents a challenge in obtaining a decreased write latency in the queue depth of one scenario. Thus, reducing the write latency in a queue depth of one scenario remains a challenge.

SUMMARY

One embodiment provides a system which facilitates data management. During operation, the system processes, by a storage device, a write request and data associated with the write request, wherein the storage device comprises a plurality of channels over which to access a non-volatile memory of the storage device. The system writes the data to a first data buffer of the storage device while bypassing a first interface and a memory controller. The system sends the write request to the memory controller via the first interface. The system writes, via a first channel allocated for host write operations, the data from the first data buffer to the non-volatile memory. The system performs a garbage collection operation on the data, which comprises accessing the data via a second channel allocated for garbage collection operations.

In some embodiments, the system performs the garbage collection operation on the data by the following operations. The system detects a condition which triggers performing the garbage collection operation on the data. The system retrieves the data from the non-volatile memory. The system performs the garbage collection operation on the retrieved data while bypassing an error correction code (ECC)-encoding module.

In some embodiments, the system performs the garbage collection operation on the retrieved data while bypassing an ECC-encoding module by the following operations. The system performs an error correction code (ECC) decoding on the retrieved data. The system stores the decoded data in a second data buffer which stores only data related to garbage collection operations. The system performs, by a first module which protects only data related to the garbage collection operations, a data-protecting operation on the decoded data.

In some embodiments, the second data buffer and the first module comprise hardware or firmware associated with a controller of the storage device, and the first module is a redundant array of independent disks (RAID) encoding module.

In some embodiments, the first interface is a Peripheral Component Interconnect Express (PCIe) interface, and the memory controller is a Non-Volatile Memory Express (NVMe) controller.

In some embodiments, the system dynamically allocates the plurality of channels as: a first group of a first set of channels which comprise the first channel and channels allocated for only host write operations; and a second group of a second set of channels which comprise the second channel and channels allocated for only garbage collection operations. Responsive to detecting a first predetermined threshold, the system shifts the allocation of the channels between the first group and the second group.

In some embodiments, the system shifts the allocation of the channels between the first group and the second group by the following operations. The system allocates a different set of channels in the second group for only garbage collection operations, wherein the different set of channels is distinct from the second set of channels, and the system allocates a remainder of the plurality of channels in the first group for only host write operations.

In some embodiments, the write request and the data associated with the write request are processed in parallel or at a similar time by the storage device.

BRIEF DESCRIPTION OF THE FIGURES

In the figures, like reference numerals refer to the same figure elements.

DETAILED DESCRIPTION

Figure 1:
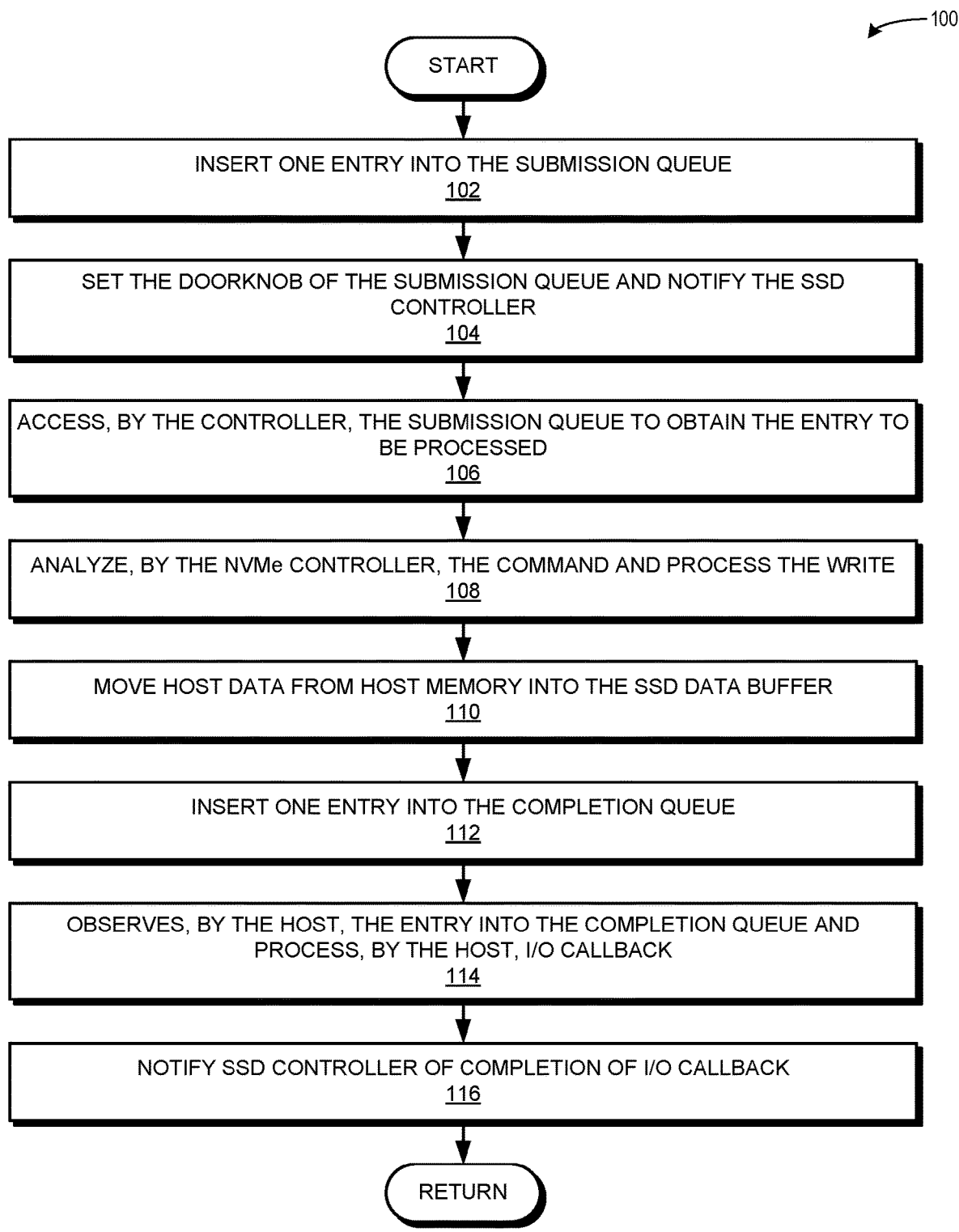
FIG. 1 presents a flowchart illustrating a method for facilitating a write operation, in accordance with the prior art.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein provide a system which facilitates a reduction in the write latency associated with handling a queue depth of one by providing: a command transfer and a data transfer in parallel; dedicated hardware for garbage collection; and a dynamic allocation and rotation of NAND channels for each of host write operations and garbage collection operations.

As described above, performance-demanding applications continue to result in increasing the queue depth of a storage device to the order of the hundreds in order to achieve an enhanced throughput. In addition, parallelism continues to grow at an increasing pace in order to address or overcome the generally long write latency associated with NAND flash. While the performance of an SSD in handling a queue depth of one may not be a practical scenario, the performance in handling a queue depth of one may still be used to evaluate an SSD as a non-trivial metric of the qualifications and features of the SSD.

One current solution for increasing the performance of an SSD involves using a PCIe interface, which places the storage drive closer to the host and can provide a lower latency. The NVMe protocol can utilize the PCIe interface in order to communicate with the host. However, a write request and associated data must travel through the PCIe interface four times (as depicted below in relation to FIG. 1), which can lead to challenges in reducing the latency. These multiple data communications can also present a challenge in obtaining a decreased write latency in the queue depth of one scenario. Thus, reducing the write latency in a queue depth of one scenario remains a challenge.

The embodiments described herein address the challenge of reducing the write latency associated with a queue depth of one scenario by providing a system with several features. First, the system can transfer a write command and its associated data in parallel, which can result in saving time which may otherwise be spent on additional communications between the NVMe controller, the PCIe interface, and the host, as described below in relation to FIGS. 2A and 2B. Second, the system can isolate the impact of garbage collection operations in the queue depth of one scenario by utilizing a stand-alone buffer and a redundant array of independent disks (RAID) circuit to handle the garbage collection operations, as described below in relation to FIG. 3. Third, the system can allocate specific bands or channels (e.g., into partitions) for host write operations and for garbage collection operations, which can eliminate the conflict between a garbage collection operation (read or write) and a host write operation, as described below in relation to FIG. 4. The system can also rotate the partitions of bands or channels in order to balance the NAND usage and the load on each channel, as described below in relation to FIG. 5.

Thus, the described embodiments provide a system which can reduce the write latency associated with a queue depth of one scenario, by: improving the host data movement (via a parallel transfer of a write request and associated data); removing occupation of the backend controller (via dedicated hardware for garbage collection); and eliminating conflicts between NAND channels (via dynamic rotation of allocated bands specifically for garbage collection operations and host write operations). The parallel data transfer can result in reducing the redundant wait time involved with the host interface protocol in the conventional storage system, while the isolation of the backend resources and the dynamic allocation of the NAND channels can ensure a non-interrupted and continuous programming flow to execute host write operations. These technical and technological improvements can result in addressing the challenges associated with the performance of a random write versus a sequential write pattern.

A "distributed storage system" or a "storage system" can include multiple storage servers. A "storage server" or a "storage system" can refer to a computing device which can include multiple storage devices or storage drives. A "storage device" or a "storage drive" refers to a device or a drive with a non-volatile memory which can provide persistent storage of data, e.g., a solid-state drive (SSD), or a flash-based storage device. A storage system can also be a computer system.

"Non-volatile memory" refers to storage media which may be used for persistent storage of data, e.g., flash memory of a NAND die of an SSD, magnetoresistive random access memory (MRAM), phase change memory (PCM), resistive random access memory (ReRAM), or another non-volatile memory.

A "computing device" refers to any server, device, node, entity, drive, or any other entity which can provide any computing capabilities.

The term "queue depth" refers to the number of pending input/output (I/O) requests for a volume, storage unit, or other storage device. The term "queue depth of one" refers to a scenario in which the number of pending I/O requests for the volume, storage unit, or other storage device is one.

Exemplary Write Operation in the Prior Art

FIG. 1 presents a flowchart illustrating a method 100 for facilitating a write operation, in accordance with the prior art. A storage system can include a host which communicates with an SSD. The SSD can include a controller, a Peripheral Component Interconnect Express (PCIe) interface, a Non-Volatile Memory express (NVMe) controller which can provide support for submission and completion queues, and a data buffer. The host can set the doorknob in the submission queue, which is subsequently observed by the SSD controller. The SSD controller can receive the host request and respond by retrieving the host data through the PCIe interface. Upon the host data being transferred or written to the data buffer of the SSD (and protected with a power loss protection module or unit), the SSD controller can notify the host of the completion of the data write by inserting the entry into the completion queue. The system can write the data from the data buffer to the NAND flash in an asynchronous manner. The host can access the completion queue through an interrupt mode or a polling mode in order to obtain acknowledgment for completion of the write request.

Specifically, the system inserts one entry (e.g., associated with a write request) into the submission queue (operation 102). The system sets the doorknob of the submission queue and notifies the SSD controller of the same (operation 104). The system accesses, by the controller, the submission queue to obtain the entry to be processed (operation 106). The system analyzes, by the NVMe controller, the command and processes the write request (operation 108). The system moves host data from the host memory into the SSD data buffer (operation 110). The system inserts one entry into the completion queue (operation 112). The system observes, by the host, the entry into the completion queue, and the system processes, by the host, the I/O callback (operation 114). The system notifies the SSD controller of completion of the I/O callback (operation 116), and the operation returns.

Figure 2A:
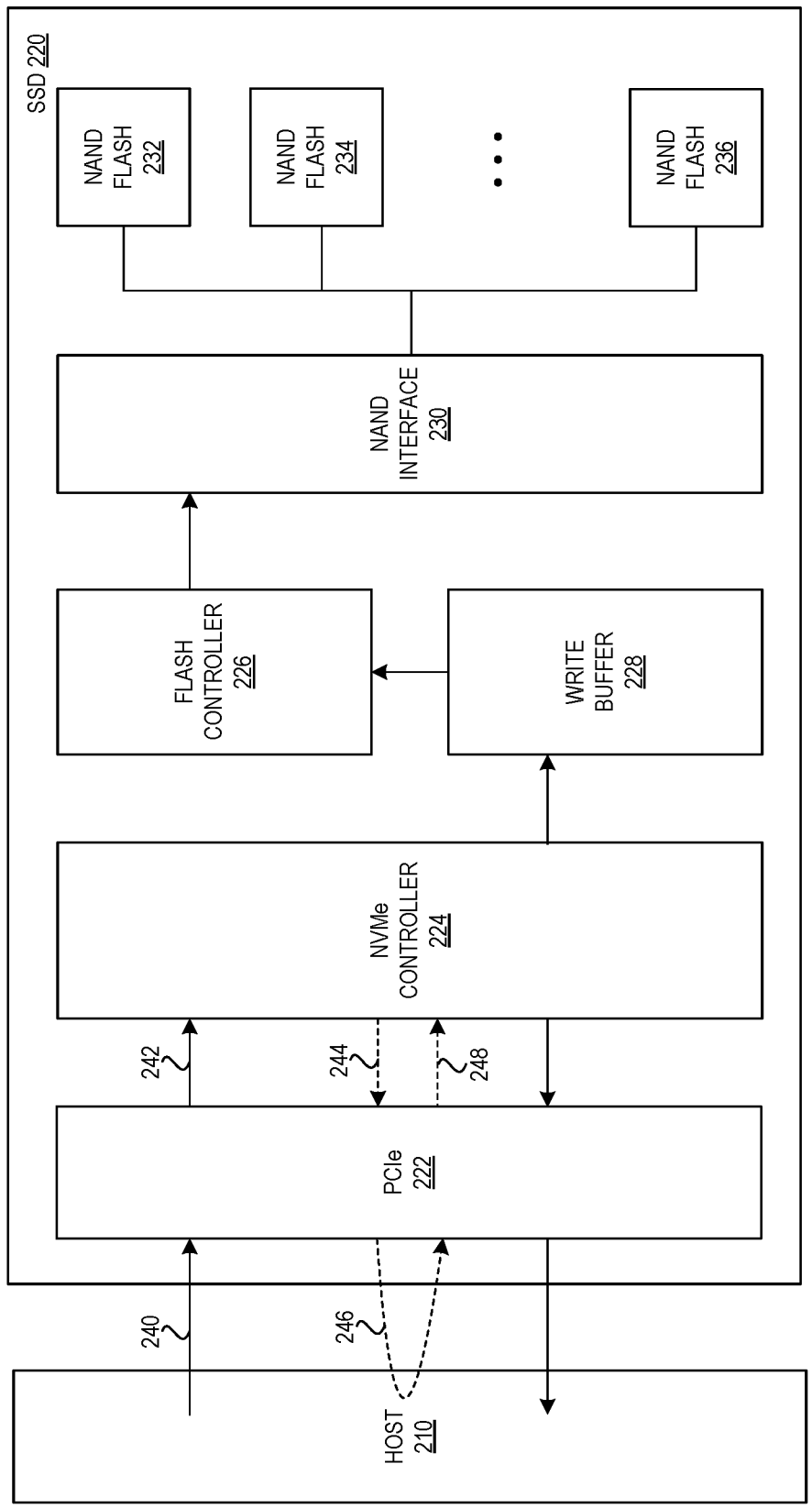
FIG. 2A illustrates an exemplary environment for a write flow, including the command transfer and the data transfer in a linear process, in accordance with the prior art.

Write Operation in the Prior Art vs. Embodiment with Parallel Command/Data Transfer FIG. 2A illustrates an exemplary environment 200 for a write flow, including a command transfer and a data transfer in a linear process, in accordance with the prior art. Environment 200 can include a host 210 which communicates with an SSD 220, which can include: a PCIe interface 222; an NVMe controller 224; a flash controller 226; a write buffer 228; a NAND interface 230; and NAND flash memory 232, 234, and 236. During operation, in processing a write request, the submission queue entry and the NVMe command analysis (e.g., communications 240 and 242, corresponding to operations 102-108 of a write operation in a conventional system) occur prior to the actual data transfer from the host to the write buffer (e.g., as indicated by the dashed arrows 244, 246, and 248). The data can subsequently be written from write buffer 228 to NAND flash 232-236 via flash controller 226 and NAND interface 230. Thus, the data transfer from host 210 to write buffer 228 cannot occur until the write request has first been processed by PCIe interface 272 and NVMe controller 274 (via communications 240 and 242), which can result in an increased latency in executing the write operation.

Figure 2B:
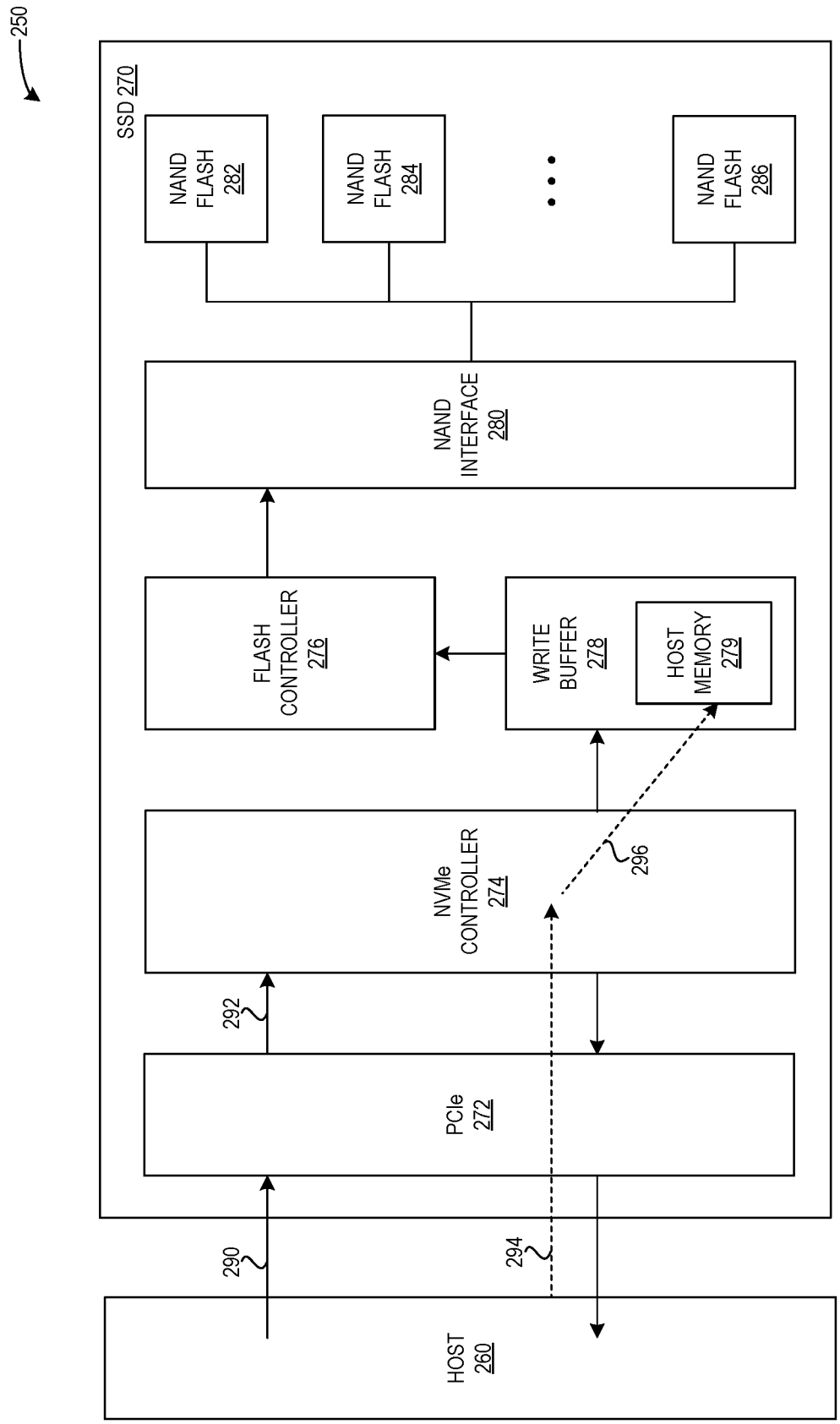
FIG. 2B illustrates an exemplary environment for a write flow, including a data transfer and a command transfer in a parallel process, in accordance with an embodiment of the present application.

FIG. 2B illustrates an exemplary environment 250 for a write flow, including the data transfer and the command transfer in a parallel process, in accordance with an embodiment of the present application. Similar to environment 200, environment 250 can include a host 260 which communicates with an SSD 270, which can include: a PCIe interface 272; an NVMe controller 274; a flash controller 276; a write buffer 278; a NAND interface 280; and NAND flash memory 282, 284, and 286. Write buffer 278 can include a host memory 279, which can be used to store data which is transferred from or received directly from host 260 while bypassing PCIe interface 272 and NVMe controller 274. Host memory 279 can be a region or portion of write buffer 278, which region is physically allocated from write buffer 278 and can be logically associated with host 260. That is, host memory 279 can logically belong to or operate under the control of host 260, but the data can physically accomplish traveling from host 260 to SSD 270 through PCIe 272.

During operation, in processing a write request, the submission queue entry and the NVMe command analysis (e.g., communications 240 and 242, corresponding to operations 102-108 of a write operation in a conventional system) can occur in parallel with the actual data transfer from host 260 to host memory 279 of write buffer 278 (e.g., as indicated by dashed arrows 294 and 296). That is, host 260 can send a write request and associated data, where the write request is processed via communications 290 and 292 by PCIe interface 272 and NVMe controller 274, and the data can be processed by a direct transfer to host memory 279 via communications 294 and 296. By the time of completion of analysis of the write request by NVMe controller 274 (via communications 290 and 292), the associated data may already be stored in host memory 279 of write buffer 279 of SSD 270. Because the data is already stored in write buffer 278, the system can write the data from write buffer 278 to NAND flash 282-286 without waiting for communications 290 and 292 to finish, and without waiting for SSD 270 to retrieve the associated data from host 260 (as depicted above in relation to FIG. 2A).

Thus, the data transfer from the host to the write buffer can occur in parallel and separate from the write request being processed by the PCIe interface and the NVMe controller, which in turn can result in the data being written to the NAND flash without waiting for completion of the write request processing (e.g., communications 290 and 292). This parallel processing of the write command and the associated data can result in a reduced latency in executing the write operation, which in turn can result in a reduced latency for the queue depth of one scenario.

Exemplary SSD Controller with Dedicated Hardware for Garbage Collection Operations As depicted above in relation to environment 250 of FIG. 2B, performing a sequential write operation can be straightforward, as the asynchronous write from the data buffer (e.g., write buffer 278) to the NAND flash (e.g., 282-286) can depend mainly on the throughput of the backend operations. However, in performing a random write operation, the system may trigger a garbage collection operation, which can, from time to time, consume the resources of the SSD controller and the NAND channels. This can result in an unstable performance for the SSD, e.g., based on the introduction of the uncontrollable (or uncontrolled) garbage collection operations. Furthermore, read operations generally take higher priority than write operations. Thus, on a given channel, a garbage collection read operation would take priority over a host write operation, which can result in delaying the host write operation and may also result in congestion or delay in executing the host write operation.

The embodiments described herein address the instability associated with these uncontrollable garbage collection operations by providing dedicated hardware (or firmware) to isolate the impact of the garbage collection operations in the queue depth of one scenario. In general, during a garbage collection operation, the system reads valid data from a block or other unit to be recycled from NAND flash, and writes the valid data back into a new block or other unit of the NAND flash. In a conventional operation, the data buffer and the RAID module are shared by both garbage collection operations and host write operations.

The described embodiments instead provide a stand-alone data buffer and a RAID circuit to handle solely and specifically the garbage collection operations. The stand-alone data buffer and RAID circuit can be implemented to handle only operations and data related to garbage collection operations. The system can read raw data from the NAND, an ECC decoder can remove the errors from the raw data to obtain a decoded codeword, and a cyclic redundancy check (CRC) module can check the sanity or integrity of the data. Because the decoded codeword includes the ECC parity, the recycled data can bypass the ECC encoder and use its specific RAID circuit to accumulate the RAID parity, which can also be written into the NAND flash, as described below in relation to FIG. 3.

Figure 3:
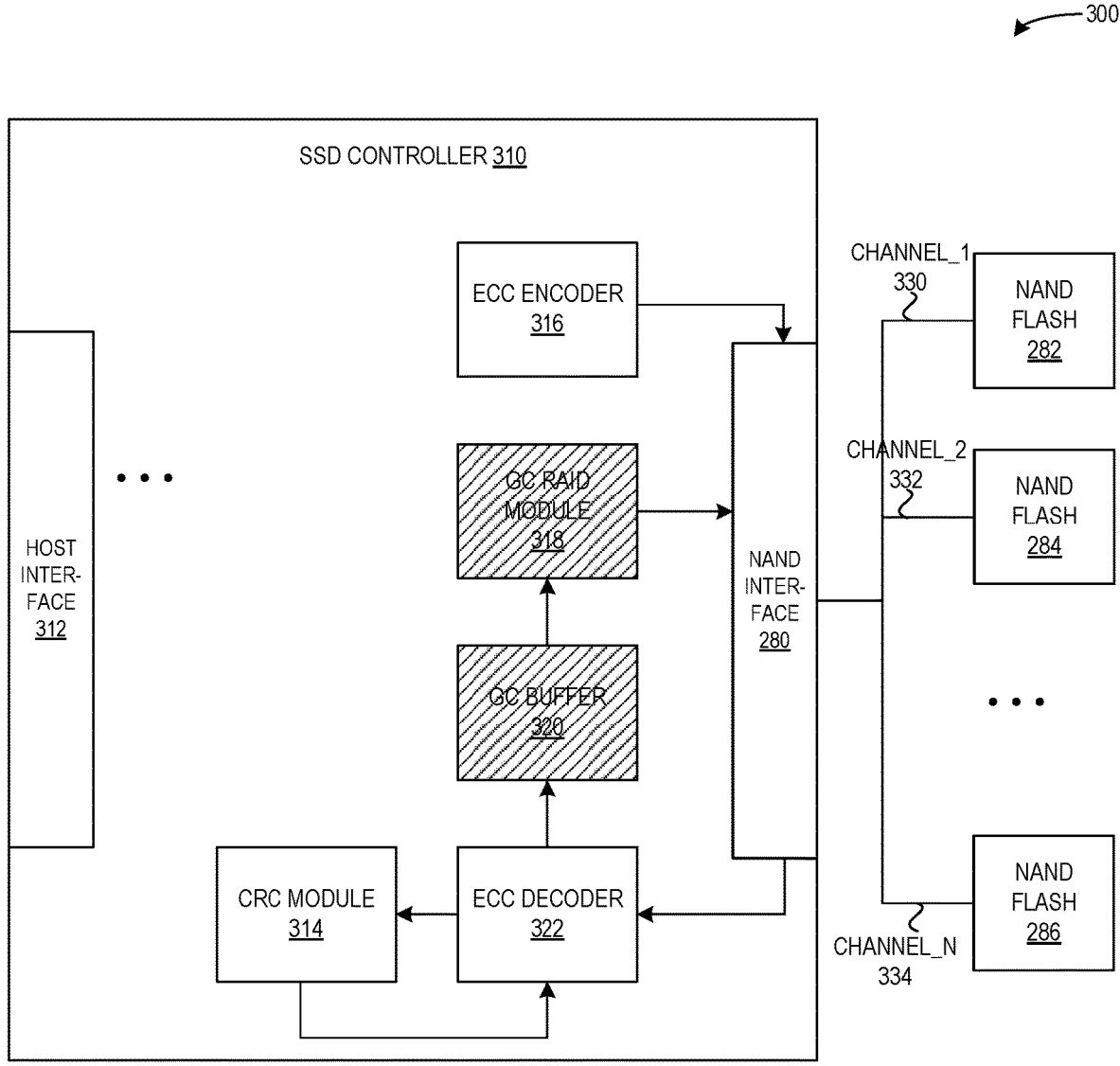
FIG. 3 illustrates an exemplary controller, including dedicated hardware for garbage collection operations, in accordance with an embodiment of the present application.

FIG. 3 illustrates an exemplary controller 310, including dedicated hardware for garbage collection operations, in accordance with an embodiment of the present application. Controller 310, in an environment 300, can include: a host interface 312; a CRC module 314; an ECC encoder 316; a garbage collection (GC) RAID module 318; a garbage collection (GC) buffer 320; an ECC decoder 322; and a NAND interface 280, which communicates with NAND flash memory 282, 284, and 286, via, respectively, a channel_1 330, a channel_2 332, and a channel_N 334.

During operation, the system can detect a condition which triggers performing a garbage collection process on certain data (e.g., valid data associated with a block to be recycled). The system can retrieve the certain data from, e.g., NAND flash 284 via channel_2 332, via NAND interface 280. The data can be transmitted to ECC decoder 322, which can perform an ECC decoding on the certain data to obtain a decoded codeword. ECC decoder 322 can send the decoded codeword to CRC module 314, which can perform a CRC to ensure the sanity or integrity of the data. The decoded (and CRC checked) data can then be stored in a specific GC buffer 320. GC buffer 320 can be a data buffer which stores only data related to garbage collection operations. The stored GC data can be sent to GC RAID module 318, which can protect only data related to garbage collection operations. The data can be subsequently written to an appropriate block (e.g., an available or open block) of NAND flash 282, 284, or 286, via, respectively, one of channels 330, 332, 334, thus bypassing ECC encoder 316.

GC RAID module 318 and GC buffer 320 can be implemented as dedicated hardware or firmware of SSD controller 310. Thus, by implementing a specific data buffer and data-protecting module for the garbage collection operations, the described embodiments can eliminate the shared usage of backend components (by both background garbage collection operations and host write operations) while processing data to be written to the non-volatile memory. This can result in solving the bottleneck in the performance (latency) of a host write operation which is conventionally caused by a read engine (which, in a conventional system, would need to handle both host flow operations and garbage collection operations). In turn, this can result in reducing the write latency associated with host write operations, including the queue depth of one scenario.

Allocated Bands/Channels for Host Write Operations and Garbage Collection Operations; and Exemplary Band Rotation Additionally, the described embodiments can dynamically allocate bands, which can include a set of channels, to each of host write operations and garbage collection operations. That is, when writing data from the controller to the NAND flash, the system can allocate specific bands of channels, such that host write operations can be processed on a first set of channels, while garbage collection operations can be processed on a different second set of channels, as described below in relation to FIG. 4. The system can also rotate the allocated bands or groups or set of channels, to balance both the usage of the NAND flash and the load on each channel, as described below in relation to FIG. 5.

Figure 4:
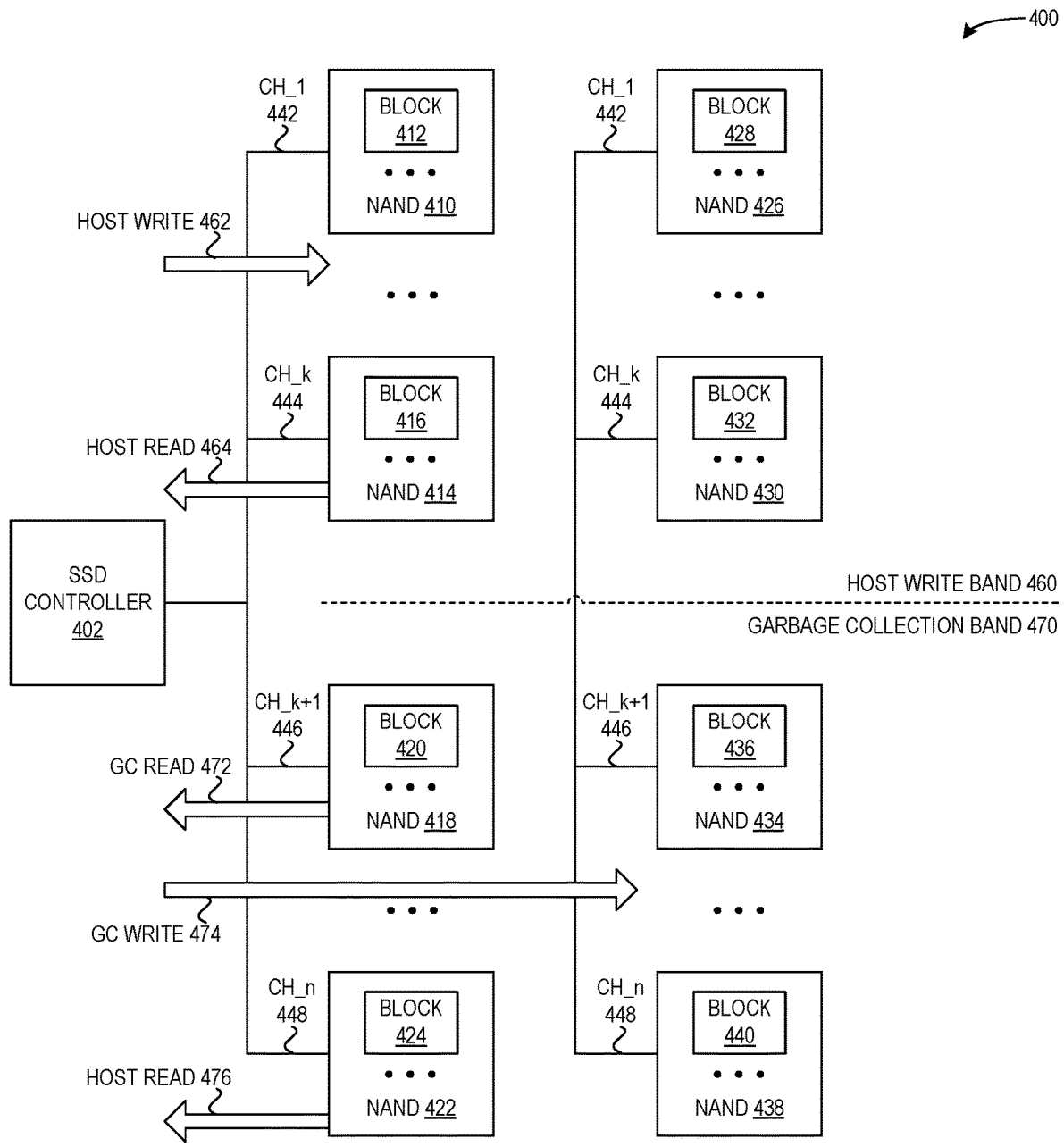
FIG. 4 illustrates a diagram of allocated physical bands for host write operations and garbage collection operations, in accordance with an embodiment of the present application.

FIG. 4 illustrates a diagram 400 of allocated physical bands for host write operations and garbage collection operations, in accordance with an embodiment of the present application. Diagram 400 can include: an SSD controller 402; NAND blocks 410 and 426, including at least, respectively, blocks 412 and 428, and accessed via a channel_1 (CH_1) 442; NAND blocks 414 and 430, including at least, respectively, blocks 416 and 432, and accessed via a channel_k (CH_k) 444; NAND blocks 418 and 434, including at least, respectively, blocks 420 and 436, and accessed via a channel_k+1 (CH_k+1) 446; and NAND blocks 422 and 438, including at least, respectively, blocks 424 and 440, and accessed via a channel_n (CH_n) 448.

The system can allocate for host write operations a host write band 460, such as a first group of a first set of channels for host write operations. The system can also allocate for garbage collection operations a garbage collection band 470, such as a second group of a second set of channels for garbage collection operations. Host write band 460 can include channels 442 and 444, while garbage collection band 470 can include channels 446 and 448.

During operation, a host read operation can occur on any channel at any time, e.g., at indicated by a host read 464 occurring via channel_k 444 of host write band 460 and a host read operation 476 occurring via channel_n 448 of garbage collection band 470. The system can process a host write operation 462 by accessing a block of NAND flash memory via an allocated channel of host write band 460, e.g., via channel_1 442. The system can also process a garbage collection read 472 or a garbage collection write 474 by accessing a block of NAND flash memory via an allocated channel of garbage collection band 470, e.g., via channel_k+1 446.

Thus, garbage collection operations (such as 472 and 474) can occur on (a channel of) a specifically GC-allocated band, which does not occupy or share space or resources of the page buffer and NAND channels used to execute host write operations. In general, the queue depth of one scenario does not generate a throughput high enough to saturate multiple NAND channels in the backend, thus the host write band is sufficient to ensure the Quality of Service (QoS) for the performance of a random write operation.

Furthermore, based a first predetermined threshold, the system can dynamically rotate the partition all of the NAND channels to transverse the NAND pages in a RAID group. The first predetermined threshold can be based on, e.g., a periodic interval; another predetermined time interval; historical usage of a channel or channels; a current load across the channels; an expected, predicted, or estimated load; a current traffic analysis; and an algorithm which ensures wear-leveling. This allows the system to balance out the both the usage of the NAND flash and the load on each channel.

Figure 5:
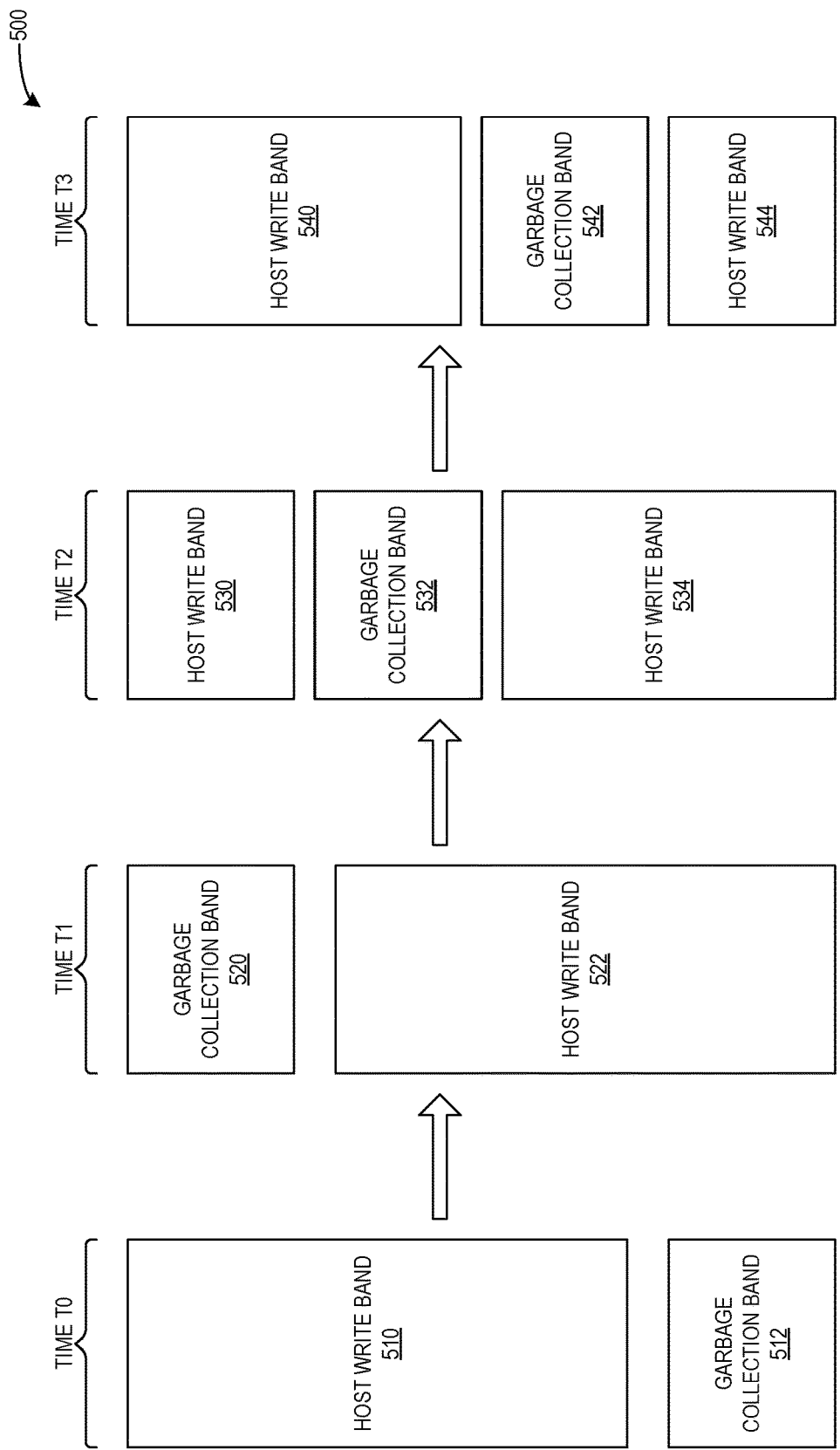
FIG. 5 presents a diagram illustrating horizontal band rotation for isolation of garbage collection operations, in accordance with an embodiment of the present application.

FIG. 5 presents a diagram 500 illustrating horizontal band rotation for isolation of garbage collection operations, in accordance with an embodiment of the present application. Diagram 500 illustrates a dynamic allocation or shifting of channels in a host write band and a garbage collection band at a plurality of times t0, t1, t2, and t3.

At a time t0, a host write band 510 can include channels (e.g., 1-6) allocated for host write operations, while a garbage collection band 512 can include channels (e.g., 7-8) allocated for garbage collection operations. At a subsequent time t1, a garbage collection band 520 can include channels (e.g., 1-2) allocated for garbage collection operations, while a host write band 522 can include channels (e.g., 3-8)

allocated for host write operations. At a time t2, a host write band 530 and a host write band 534 can include channels (e.g., respectively, 1-2 and 5-8) allocated for host write operations, while a garbage collection band 532 can include channels (e.g., 3-4) allocated for garbage collection operations. At a time t3, a host write band 540 and a host write band 544 can include channels (e.g., respectively, 1-4 and 7-8) allocated for host write operations, while a garbage collection band 542 can include channels (e.g., 5-6) allocated for garbage collection operations.

Thus, diagram 500 depicts how the system can partition the NAND channels into bands, and can further adjust the partition of the NAND channels into the bands over time. The system can rotate or shift the allocation of the channels into each band, which allows the GC band to rotate through all other pages covered in the same RAID group. This dynamic partition, allocation, and rotation can ensure that all pages in a RAID group are covered, while also ensuring a decrease in the write latency associated with host write operations, including a queue depth of one scenario.

Exemplary Method for Facilitating a Write Latency Reduction

Figure 6A:
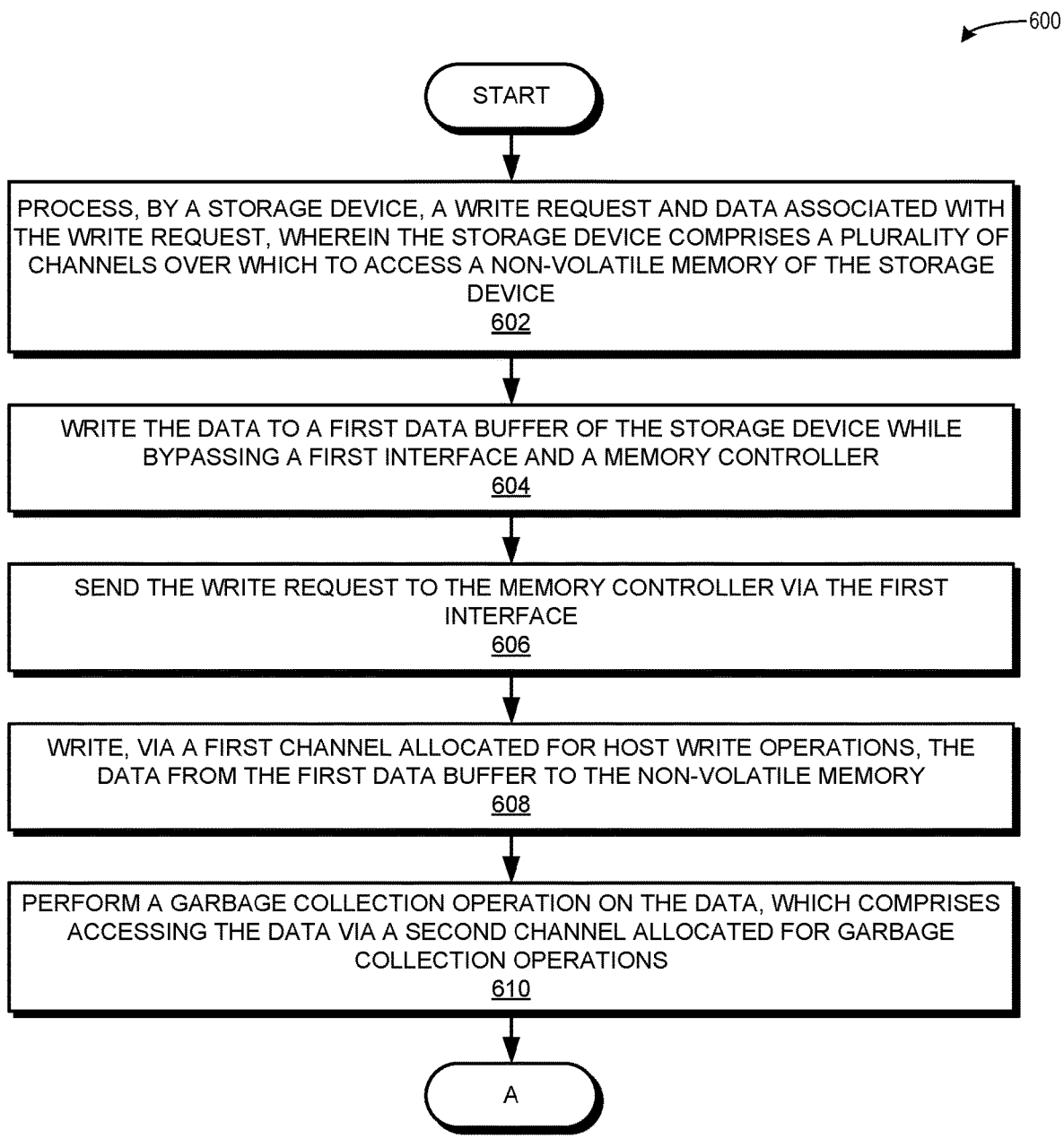
FIG. 6A presents a flowchart illustrating a method for facilitating a write latency reduction, in accordance with an embodiment of the present application.

FIG. 6A presents a flowchart 600 illustrating a method for facilitating a write latency reduction, in accordance with an embodiment of the present application. During operation, the system processes, by a storage device, a write request and data associated with the write request, wherein the storage device comprises a plurality of channels over which to access a non-volatile memory of the storage device (operation 602). The system writes the data to a first data buffer of the storage device while bypassing a first interface and a memory controller (operation 604). The system sends the write request to the memory controller via the first interface (operation 606). The system writes, via a first channel allocated for host write operations, the data from the first data buffer to the non-volatile memory (operation 608). The system performs a garbage collection operation on the data, which comprises accessing the data via a second channel allocated for garbage collection operations (operation 610). The operation continues at Label A of FIG. 6B.

Figure 6B:
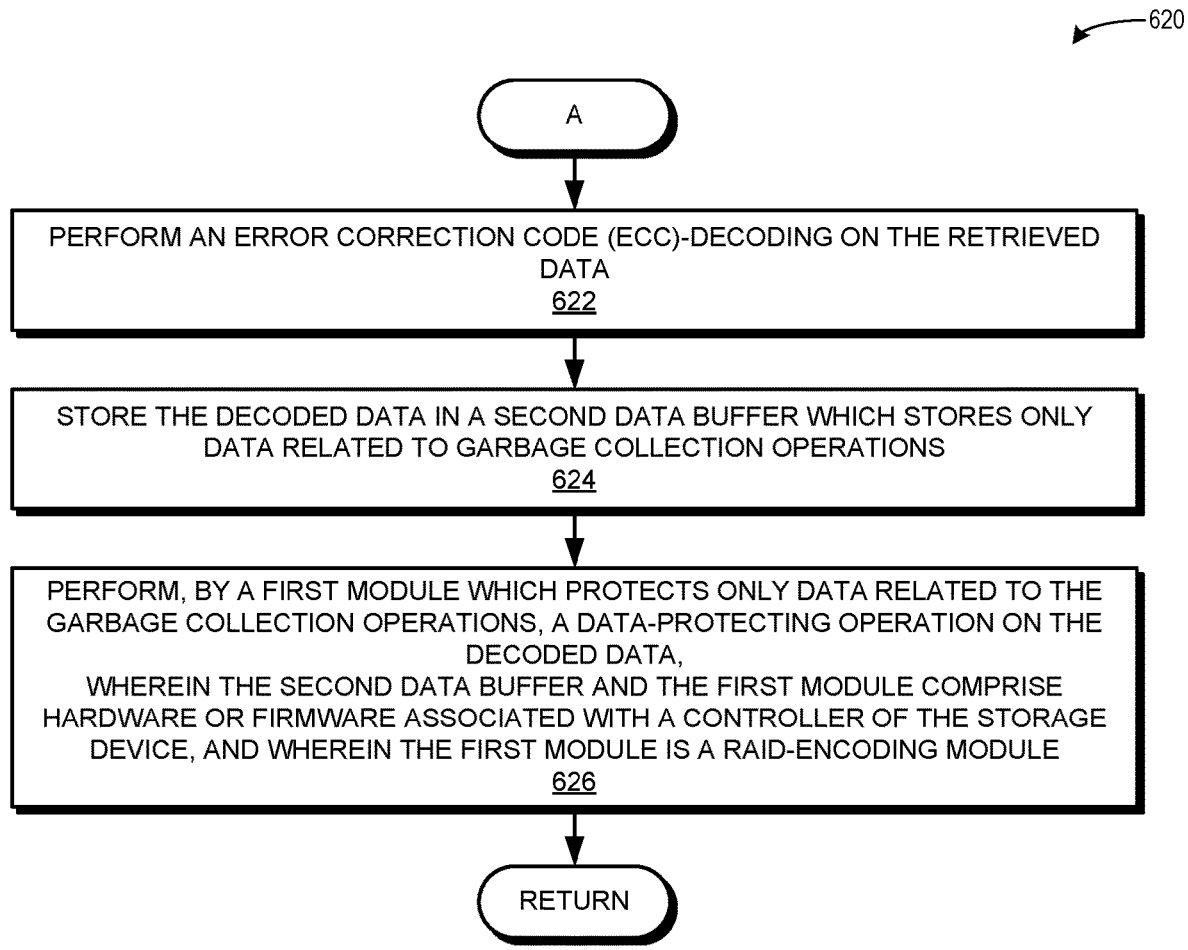
FIG. 6B presents a flowchart illustrating a method for facilitating a write latency reduction, in accordance with an embodiment of the present application.

FIG. 6B presents a flowchart 620 illustrating a method for facilitating a write latency reduction, in accordance with an embodiment of the present application. The system can perform a garbage collection operation on retrieved data while bypassing an ECC-encoding module. The system performs an error correction code (ECC) decoding on the retrieved data (operation 622). The system stores the decoded data in a second data buffer which stores only data related to garbage collection operations (operation 624). The system performs, by a first module which protects only data related to the garbage collection operations, a data-protecting operation on the decoded data (operation 626). The second data buffer and the first module can comprise hardware or firmware associated with a controller of the storage device, and the first module can be a redundant array of independent disks (RAID) encoding module, as described above in relation to FIG. 3.

Figure 6C:
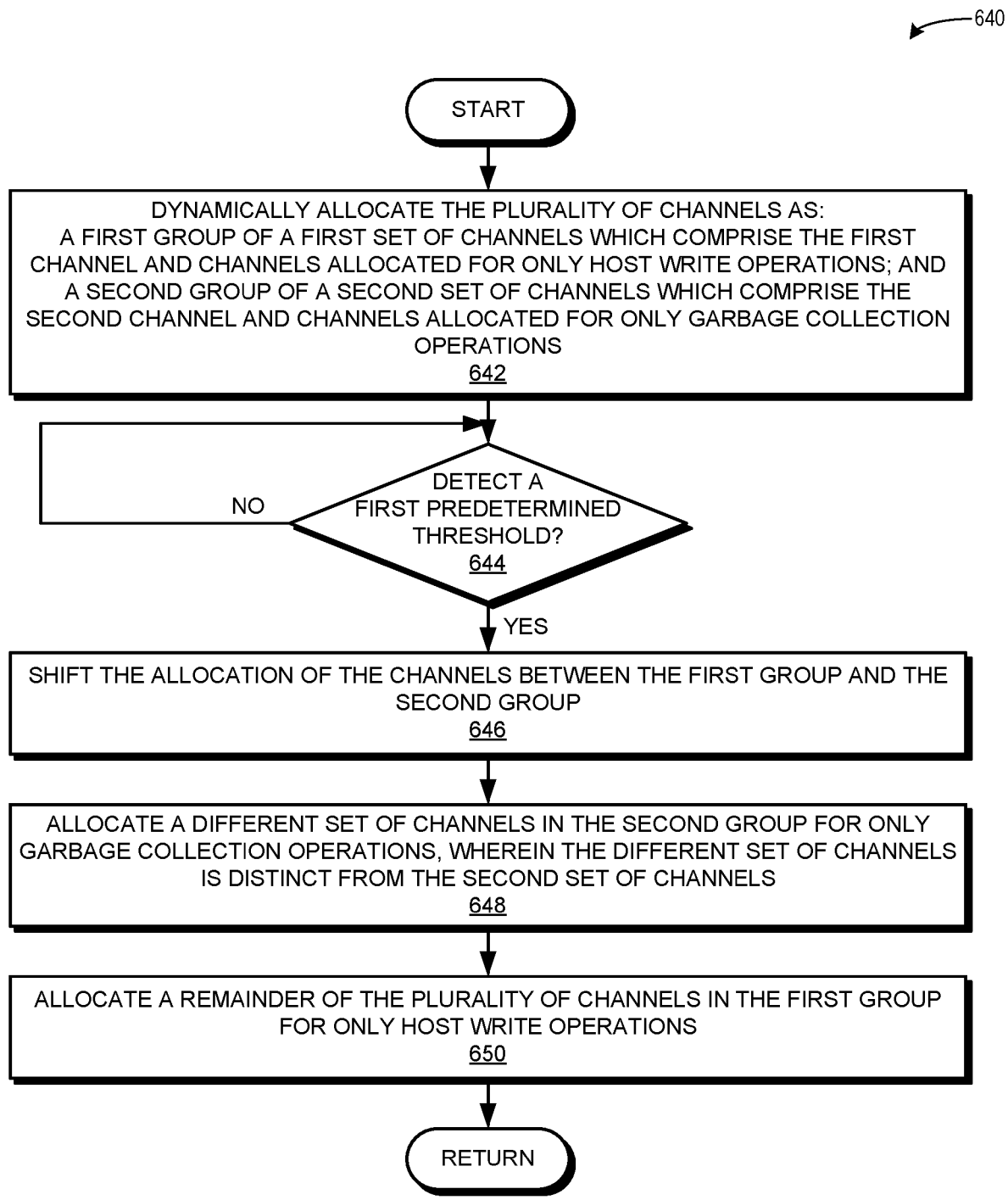
FIG. 6C presents a flowchart illustrating a method for facilitating a write latency reduction, in accordance with an embodiment of the present application.

FIG. 6C presents a flowchart 640 illustrating a method for facilitating a write latency reduction, in accordance with an embodiment of the present application. The operations of flowchart 640 can occur prior to or concurrent with the operations of flowcharts 600 and 620. The system dynamically allocates the plurality of channels as: a first group of a first set of channels which comprise the first channel and channels allocated for only host write operations; and a second group of a second set of channels which comprise the second channel and channels allocated for only garbage collection operations (operation 642). If the system does not detect a first predetermined threshold (decision 644), the operation returns to decision 644 until the first predetermined threshold is detected.

If the system does not detect a first predetermined threshold (decision 644), the system shifts the allocation of the channels between the first group and the second group (operation 646). The system allocates a different set of channels in the second group for only garbage collection operations, wherein the different set of channels is distinct from the second set of channels (operation 648), and the system allocates a remainder of the plurality of channels in the first group for only host write operations (operation 650).

Exemplary Computer System and Apparatus

Figure 7:
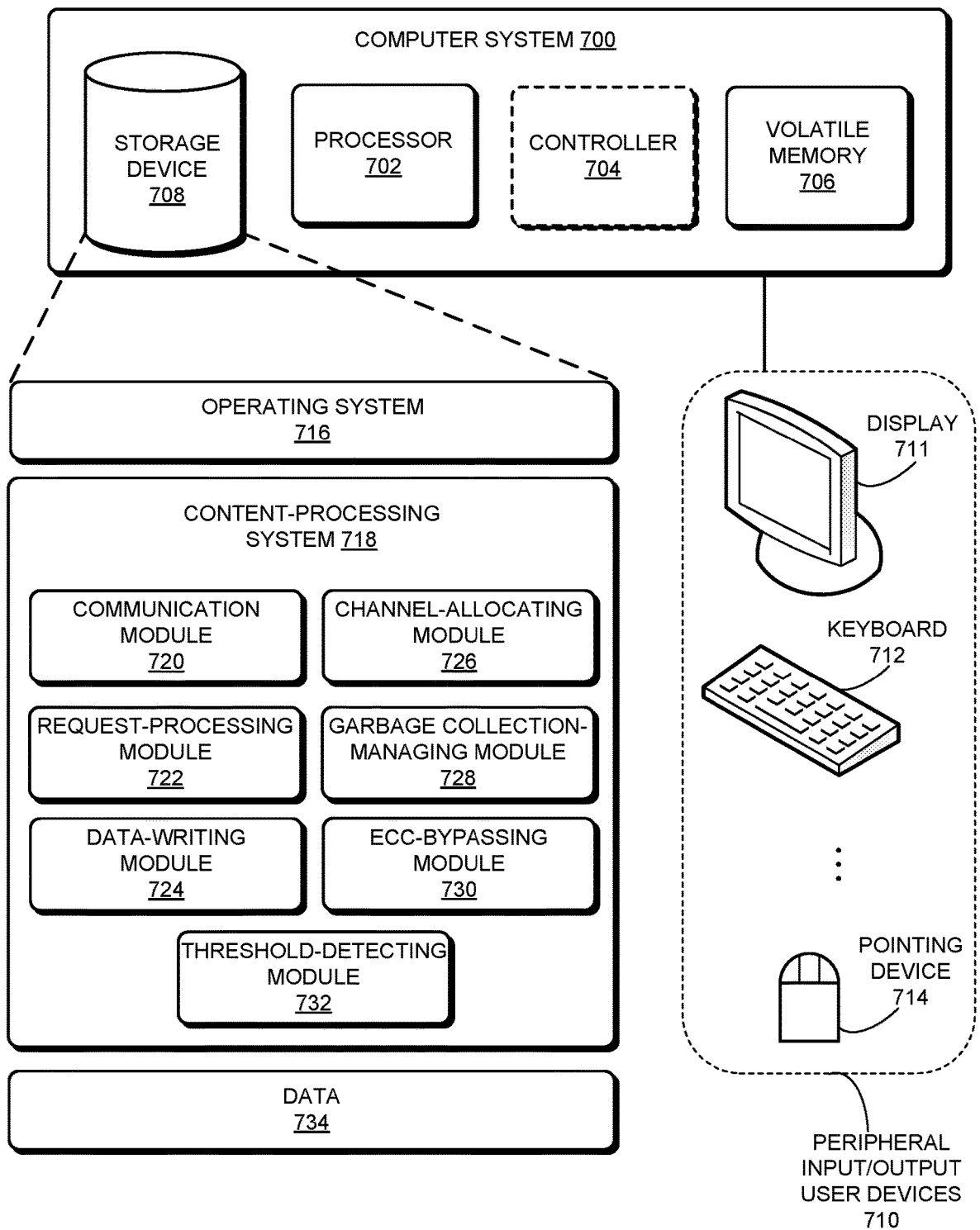
FIG. 7 illustrates an exemplary computer system that facilitates data movement while bypassing system memory, in accordance with an embodiment of the present application.

FIG. 7 illustrates an exemplary computer system 700 that facilitates data movement while bypassing system memory, in accordance with an embodiment of the present application. Computer system 700 includes a processor 702, a volatile memory 706, and a storage device 708. In some embodiments, computer system 700 can include a controller 704 (indicated by the dashed lines). Volatile memory 706 can include, e.g., random access memory (RAM), that serves as a managed memory, and can be used to store one or more memory pools. Storage device 708 can include persistent storage which can be managed or accessed via processor 702 (or controller 704). Furthermore, computer system 700 can be coupled to peripheral input/output (I/O) user devices 710, e.g., a display device 711, a keyboard 712, and a pointing device 714. Storage device 708 can store an operating system 716, a content-processing system 718, and data 734.

Content-processing system 718 can include instructions, which when executed by computer system 700, can cause computer system 700 or processor 702 to perform methods and/or processes described in this disclosure. Specifically, content-processing system 718 can include instructions for receiving and transmitting data packets, including data to be read or written, and an input/output (I/O) request (e.g., a read request or a write request) (communication module 720).

Content-processing system 718 can further include instructions for processing, by a storage device, a write request and data associated with the write request, wherein the storage device comprises a plurality of channels over which to access a non-volatile memory of the storage device (request-processing module 722). Content-processing system 718 can include instructions for writing the data to a first data buffer of the storage device while bypassing a first interface and a memory controller (data-writing module 724). Content-processing system 718 can include instructions for sending the write request to the memory controller via the first interface (request-processing module 722). Content-processing system 718 can include instructions for writing, via a first channel allocated for host write operations, the data from the first data buffer to the non-volatile memory (data-writing module 724). Content-processing system 718 can include instructions for performing a garbage collection operation on the data, which comprises accessing the data via a second channel allocated for garbage collection operations (garbage collection-managing module 728).

Content-processing system 718 can additionally include instructions for detecting a condition which triggers performing the garbage collection operation on the data (threshold-detecting module 732). Content-processing system 718 can include instructions for retrieving the data from the non-volatile memory (communication module 720). Content-processing system 718 can include instructions for performing the garbage collection operation on the retrieved data while bypassing an error correction code (ECC)-encoding module (garbage collection-managing module 728 and ECC-bypassing module 730).

Data 734 can include any data that is required as input or generated as output by the methods and/or processes described in this disclosure. Specifically, data 734 can store at least: data; a request; a read request; a write request; an input/output (I/O) request; data or metadata associated with a read request, a write request, or an I/O request; formatted data; encoded data; CRC data; CRC-checked data; ECC-encoded or ECC-decoded data; an indicator or identifier of a storage drive, an interface, a memory controller, a write buffer, a host memory in the write buffer, a channel, and a NAND flash block or unit; a condition which triggers a garbage collection process; a predetermined threshold for shifting an allocation of channels to bands; data marked to be recycled or on which a garbage collection process is to be performed; an indicator of a GC-specific data buffer or a GC-specific RAID or data-protecting module; raw data; ECC-encoded data; a codeword; a decoded codeword; an indicator of a channel, a band, an allocated channel to a band; an indicator or identifier of a host write band or a garbage collection band; a channel allocated for host write operations; a channel allocated for garbage collection operations; a first set of channels; a second set of channels; and a different set of channels.

Figure 8:
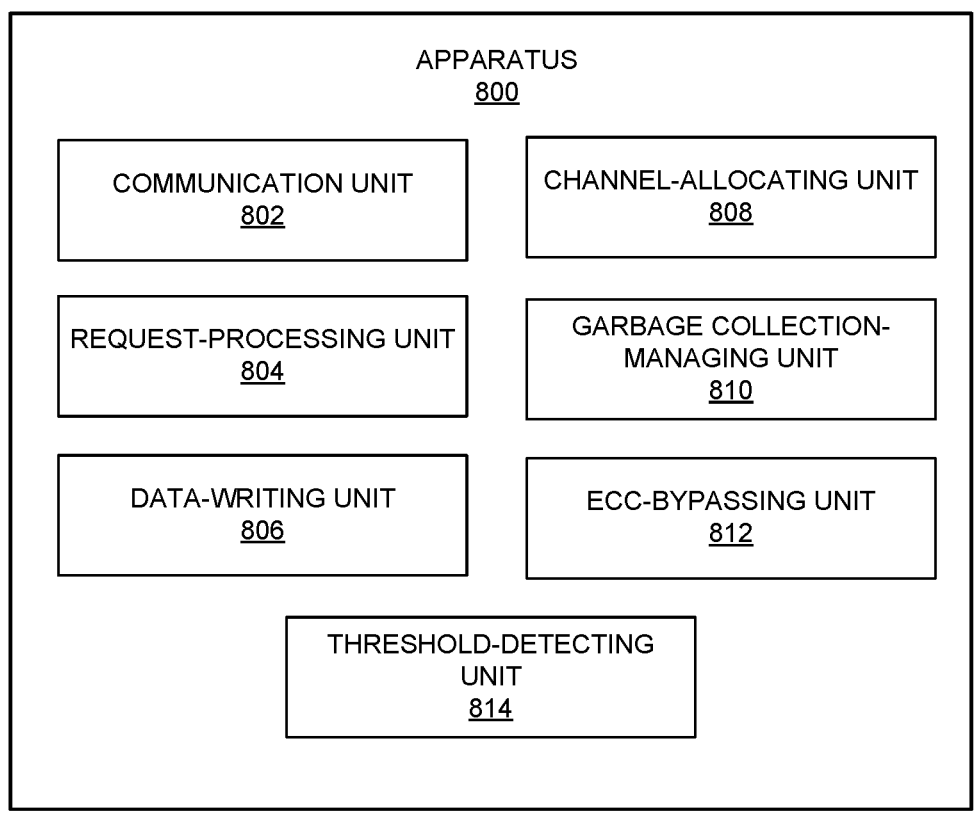
FIG. 8 illustrates an exemplary apparatus that facilitates data movement by bypassing system memory, in accordance with an embodiment of the present application.

FIG. 8 illustrates an exemplary apparatus 800 that facilitates data movement by bypassing system memory, in accordance with an embodiment of the present application. Apparatus 800 can comprise a plurality of units or apparatuses which may communicate with one another via a wired, wireless, quantum light, or electrical communication channel. Apparatus 800 may be realized using one or more integrated circuits, and may include fewer or more units or apparatuses than those shown in FIG. 8. Furthermore, apparatus 800 may be integrated in a computer system, or realized as a separate device or devices capable of communicating with other computer systems and/or devices.

Apparatus 800 can comprise modules or units 802-814 which are configured to perform functions or operations similar to modules 720-732 of computer system 700 of FIG. 7, including: a communication unit 802; a request-processing unit 804; a data-writing unit 806; a channel-allocating unit 808; a garbage collection-managing unit 810; an ECC-bypassing unit 812; and a threshold-detecting unit 814.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method, comprising:
processing, by a storage device, a write request and data associated with the write request, wherein the storage device comprises a plurality of channels over which to access a non-volatile memory of the storage device;
writing the data to a first data buffer of the storage device while bypassing a first interface and a memory controller;
sending the write request to the memory controller via the first interface;
writing, via a first channel allocated for host write operations, the data from the first data buffer to the non-volatile memory; and
performing a garbage collection operation on the data, which comprises:
detecting a condition which triggers performing the garbage collection operation on the data;
accessing the data via a second channel allocated for garbage collection operations;
retrieving the data from the non-volatile memory; and
performing the garbage collection operation on the retrieved data while bypassing an error correction code (ECC)-encoding module.

2. The method of claim 1, wherein performing the garbage collection operation on the retrieved data while bypassing an ECC-encoding module comprises:
performing an error correction code (ECC) decoding on the retrieved data;
storing the decoded data in a second data buffer which stores only data related to garbage collection operations; and
performing, by a first module which protects only data related to the garbage collection operations, a data-protecting operation on the decoded data.

3. The method of claim 2,
wherein the second data buffer and the first module comprise hardware or firmware associated with a controller of the storage device, and
wherein the first module is a redundant array of independent disks (RAID) encoding module.

4. The method of claim 1,
wherein the first interface is a Peripheral Component Interconnect Express (PCIe) interface, and
wherein the memory controller is a Non-Volatile Memory Express (NVMe) controller.

5. The method of claim 1, further comprising:
dynamically allocating the plurality of channels as:
a first group of a first set of channels which comprise the first channel and channels allocated for only host write operations; and a second group of a second set of channels which comprise the second channel and channels allocated for only garbage collection operations; and responsive to detecting a first predetermined threshold, shifting the allocation of the channels between the first group and the second group.

6. The method of claim 5, wherein shifting the allocation of the channels between the first group and the second group comprises:

allocating a different set of channels in the second group for only garbage collection operations, wherein the different set of channels is distinct from the second set of channels; and allocating a remainder of the plurality of channels in the first group for only host write operations.

7. The method of claim 1, wherein the write request and the data associated with the write request are processed in parallel or at a similar time by the storage device.

8. A computer system, comprising:

a processor; and a memory coupled to the processor and storing instructions which, when executed by the processor, cause the processor to perform a method, the method comprising:

processing, by a storage device, a write request and data associated with the write request, wherein the storage device comprises a plurality of channels over which to access a non-volatile memory of the storage device;

writing the data to a first data buffer of the storage device while bypassing a first interface and a memory controller;

sending the write request to the memory controller via the first interface;

writing, via a first channel allocated for host write operations, the data from the first data buffer to the non-volatile memory; and performing a garbage collection operation on the data, which comprises:

detecting a condition which triggers performing the garbage collection operation on the data;

accessing the data via a second channel allocated for garbage collection operations;

retrieving the data from the non-volatile memory; and performing the garbage collection operation on the retrieved data while bypassing an error correction code (ECC)-encoding module.

9. The computer system of claim 8, wherein performing the garbage collection operation on the retrieved data while bypassing an ECC-encoding module comprises:

performing an error correction code (ECC) decoding on the retrieved data;

storing the decoded data in a second data buffer which stores only data related to garbage collection operations; and performing, by a first module which protects only data related to the garbage collection operations, a data-protecting operation on the decoded data.

10. The computer system of claim 9, wherein the second data buffer and the first module comprise hardware or firmware associated with a controller of the storage device, and wherein the first module is a redundant array of independent disks (RAID) encoding module.

11. The computer system of claim 8, wherein the first interface is a Peripheral Component Interconnect Express (PCIe) interface, and wherein the memory controller is a Non-Volatile Memory Express (NVMe) controller.

12. The computer system of claim 8, wherein the method further comprises:

dynamically allocating the plurality of channels as:

a first group of a first set of channels which comprise the first channel and channels allocated for only host write operations; and a second group of a second set of channels which comprise the second channel and channels allocated for only garbage collection operations; and responsive to detecting a first predetermined threshold, shifting the allocation of the channels between the first group and the second group.

13. The computer system of claim 12, wherein shifting the allocation of the channels between the first group and the second group comprises:

allocating a different set of channels in the second group for only garbage collection operations, wherein the different set of channels is distinct from the second set of channels; and allocating a remainder of the plurality of channels in the first group for only host write operations.

14. The computer system of claim 9, wherein the write request and the data associated with the write request are processed in parallel or at a similar time by the storage device.

15. A non-transitory computer-readable storage medium storing instructions that when executed by a computer cause the computer to perform a method, the method comprising:

processing, by a storage device, a write request and data associated with the write request, wherein the storage device comprises a plurality of channels over which to access a non-volatile memory of the storage device;

writing the data to a first data buffer of the storage device while bypassing a first interface and a memory controller;

sending the write request to the memory controller via the first interface;

writing, via a first channel allocated for host write operations, the data from the first data buffer to the non-volatile memory; and performing a garbage collection operation on the data, which comprises:

detecting a condition which triggers performing the garbage collection operation on the data;

accessing the data via a second channel allocated for garbage collection operations;

retrieving the data from the non-volatile memory; and performing the garbage collection operation on the retrieved data while bypassing an error correction code (ECC)-encoding module.

16. The storage medium of claim 15, wherein performing the garbage collection operation on the retrieved data while bypassing an ECC-encoding module comprises:

performing an error correction code (ECC) decoding on the retrieved data;

storing the decoded data in a second data buffer which stores only data related to garbage collection operations; and performing, by a first module which protects only data related to the garbage collection operations, a data-protecting operation on the decoded data.

17. The storage medium of claim 15, wherein the method further comprises:
- dynamically allocating the plurality of channels as:
  - a first group of a first set of channels which comprise the first channel and channels allocated for only host write operations; and
  - a second group of a second set of channels which comprise the second channel and channels allocated for only garbage collection operations; and
- responsive to detecting a first predetermined threshold, shifting the allocation of the channels between the first group and the second group, which comprises:
  - allocating a different set of channels in the second group for only garbage collection operations, wherein the different set of channels is distinct from the second set of channels; and
- allocating a remainder of the plurality of channels in the first group for only host write operations.

\* \* \* \* \*